(12) United States Patent
Holmes et al.

(10) Patent No.: US 11,804,651 B2
(45) Date of Patent: *Oct. 31, 2023

(54) WIRELESS TELECOMMUNICATION ANTENNA MOUNT AND CONTROL SYSTEM AND METHODS OF OPERATING THE SAME

(71) Applicant: Radiarc Technologies, LLC, Wakefield, MA (US)

(72) Inventors: Stephen Holmes, Revere, MA (US); Arthur P. Clifford, Gloucester, MA (US)

(73) Assignee: Radiarc Technologies, LLC, Wakefield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/822,913

(22) Filed: Aug. 29, 2022

(65) Prior Publication Data
US 2022/0416415 A1    Dec. 29, 2022

Related U.S. Application Data

(63) Continuation of application No. 17/313,809, filed on May 6, 2021, now Pat. No. 11,431,091, which is a
(Continued)

(51) Int. Cl.
*H01Q 3/00* (2006.01)
*H01Q 1/24* (2006.01)
(Continued)

(52) U.S. Cl.
CPC ............ *H01Q 3/005* (2013.01); *H01Q 1/246* (2013.01); *H01Q 3/08* (2013.01); *H04W 16/28* (2013.01)

(58) Field of Classification Search
CPC ............ H01Q 3/005; H01Q 3/02; H01Q 3/04; H01Q 3/06; H01Q 3/08; H01Q 1/1228; H01Q 1/246; H04W 16/28
See application file for complete search history.

(56) References Cited

U.S. PATENT DOCUMENTS

| 9,306,278 B2 | 4/2016 | Lever et al. |
|---|---|---|
| 10,511,090 B2 | 12/2019 | Clifford et al. |

(Continued)

FOREIGN PATENT DOCUMENTS

| CN | 1937803 A | 3/2007 |
|---|---|---|
| CN | 209133694 U | 7/2019 |

(Continued)

OTHER PUBLICATIONS

Gemintek—RET Solution Expert, "Precisian AISG Device Manager", Gemintek Corporation, 5F-1, No. 8, Alley 30, Lane 358, Ruiguang Road, Neihu, Taipei, Taiwan, http:www.gemintek.com.tw.

*Primary Examiner* — Daniel Munoz
(74) *Attorney, Agent, or Firm* — Stephen Holmes

(57) ABSTRACT

A remotely controllable antenna mount for use with a wireless telecommunication antenna provides mechanical azimuth and tilt adjustment using AISG compatible motor control units and AISG control and monitoring systems to remotely adjust the physical orientation of the antenna. An AISG compatible mount azimuth control unit drives rotatable movement of the antenna through a range of azimuth angle positions. An AISG compatible mount tilt control unit drives linear movement of an actuator assembly and corresponding pivoting of the antenna through a range of tilt angle positions. Antennas can be remotely controlled relative to each other or in tandem.

4 Claims, 25 Drawing Sheets

Related U.S. Application Data continuation of application No. 16/869,615, filed on May 8, 2020, now Pat. No. 11,005,177, which is a continuation-in-part of application No. 16/315,229, filed as application No. PCT/US2017/041586 on Jul. 11, 2017, now Pat. No. 10,944,169, which is a continuation-in-part of application No. 15/207,159, filed on Jul. 11, 2016, now Pat. No. 10,511,090.

(60) Provisional application No. 62/383,647, filed on Sep. 6, 2016.

(51) Int. Cl.
  *H01Q 3/08* (2006.01)
  *H04W 16/28* (2009.01)

(56) References Cited

U.S. PATENT DOCUMENTS

| | | |
|---|---|---|
| 2003/0160731 A1 | 8/2003 | Wensink |
| 2007/0241979 A1 | 10/2007 | Yang |
| 2007/0290935 A1 | 12/2007 | Franzon et al. |
| 2008/0036670 A1* | 2/2008 | Arvidsson ............. H01Q 3/32 343/758 |
| 2009/0135074 A1 | 5/2009 | Fang et al. |
| 2010/0231450 A1 | 9/2010 | Le Sage |
| 2012/0062356 A1* | 3/2012 | Mann .................. H01Q 1/246 340/3.5 |
| 2015/0144758 A1* | 5/2015 | Kolokotronis ....... H01Q 1/1228 248/282.1 |
| 2016/0211576 A1 | 7/2016 | Vassilakis |
| 2016/0240910 A1* | 8/2016 | Balter .................... G01S 3/46 |
| 2017/0040682 A1* | 2/2017 | Lee ....................... H04B 17/17 |
| 2017/0289323 A1 | 10/2017 | Gelvin et al. |
| 2018/0159199 A1 | 6/2018 | Fasmetrics |
| 2019/0372686 A1 | 12/2019 | Patel |
| 2020/0194884 A1 | 6/2020 | Clifford et al. |
| 2021/0328342 A1 | 10/2021 | Clifford et al. |

FOREIGN PATENT DOCUMENTS

| | | |
|---|---|---|
| EP | 2424040 A1 | 2/2012 |
| WO | 2011140794 A1 | 11/2011 |
| WO | 2018013602 A2 | 1/2018 |

\* cited by examiner

WIRELESS TELECOMMUNICATION ANTENNA MOUNT AND CONTROL SYSTEM AND METHODS OF OPERATING THE SAME

CROSS-REFERENCE TO RELATED APPLICATIONS

This application is a continuation of U.S. application Ser. No. 17/313,809, filed May 6, 2021, which is a continuation of U.S. application Ser. No. 16/869,615, filed May 8, 2020, now U.S. Pat. No. 11,005,177, Issued May 11, 2021, which is a continuation-in-part of U.S. application Ser. No. 16/315, 229, filed Jan. 4, 2019, now U.S. Pat. No. 10,944,169, Issued Mar. 9, 2021, which is a 371 national stage filing of PCT/US2017/041586 filed Jul. 11, 2017 which is a continuation-in-part of U.S. application Ser. No. 15/207,159, filed Jul. 11, 2016, now U.S. Pat. No. 10,511,090, issued Dec. 17, 2019.

PCT/US2017/041586 also claims the benefit of U.S. Provisional Application No. 62/383,647 filed Sep. 6, 2016, the entire contents of which is incorporated herein by reference.

BACKGROUND OF THE INVENTION

Field of the Invention

The instant invention relates to wireless telecommunication (T/C) systems. More specifically, the invention relates to a wireless T/C antenna mounts and their methods of operation.

Description of Related Art

Over the last 20 years, the use of cellular phones as a primary means of communication has exploded worldwide. In order to provide coverage area and bandwidth for the millions of cell phones in use, there has also been a huge increase in the number of T/C transmitter/receiver antenna installations (T/C installations) and the number of T/C transmitter/receiver antennas (antennas) mounted on those T/C installations. In most cases, the antennas are mounted on towers, monopoles, smokestacks, buildings, poles or other high structures to provide good signal propagation and coverage. There are literally hundreds of thousands of T/C installations in the U.S., with each installation carrying multiple antennas from multiple carriers.

Referring to FIGS. 1-3, each tower or installation 10 has an associated base station 12, which includes power supplies, radio equipment, interfaces with conventional wire and/or fiber optic T/C system nodes 14, microwave links, etc. The base station node(s) 14, in turn, have a wireless or wired connection to each carrier's Network Operations Center (NOC) 16 to monitor and control the transmission of T/C signals to and from the antennas 18 and over the carrier's network.

At each tower installation, each carrier will typically have three separate antennas 18 oriented 120° apart to serve three operational sectors of its service area. Some installations may also have multiple different antennas in each sector transmitting and receiving separate communication bandwidths. However, it should be noted that many other types of installations may have only a single antenna 18. For example, antennas 18 mounted on the sides of building are typically pointed in a single direction to provide coverage in a particular direction, i.e. towards a highway.

Each antenna 18 is typically mounted on a vertical pole 20 using a mount 22 having some ability to manually adjust the orientation (azimuth and tilt) of the antenna 18 relative to the desired service area. Typical manual adjustment of tilt, or downtilt position (angular direction around a horizontal pivot axis) involves manually tilting the antenna 18 downward using a mechanical downtilt bracket 21 (usually provided as part of the mount or antenna) and rigidly clamping or tightening the tilt bracket 21 in the desired position (FIGS. 2A and 2B). Typical manual adjustment of an azimuth position (angular direction around a vertical axis) involves manually rotating the mount 21 around the vertical pole 20 and physically clamping the mount 21 in the desired position (FIGS. 2C and 2D). The fixed mounting positions are not typically moved unless absolutely necessary.

When a carrier designs a service coverage area, they will specify the desired azimuth and tilt angles of the antennas 18 that they believe will provide the best service coverage area for that installation 10. Antenna installers will climb the tower or building and install the antennas 18 to the provider's specifications and orientation (azimuth and mechanical tilt). Operational testing is completed and the antenna mounts 21 are physically clamped down into final fixed positions. However, various environmental factors often affect the operation of the antennas 18, and adjustments are often necessary. RF interference, construction of new buildings in the area, tree growth, etc. are all issues that affect the operation of an antenna 18. Additionally, the growth of surrounding population areas often increases or shifts signal traffic within a service area requiring adjustments to the RF service design for a particular installation. Further adjustment of the antennas 18 involves sending a maintenance team back to the site to again climb the tower or building and manually adjust the physical orientation of the antenna(s) 18. As can be appreciated, climbing towers and buildings is a dangerous job and creates a tremendous expense for the carriers to make repeated adjustments to coverage area as well as a tremendous risk for the tower climbers.

As a partial solution to adjusting the vertical downtilt of an antenna 18, antennas may include an internal "electrical" tilt adjustment which electrically shifts the signal phase of internal elements (not shown) of the antenna 18 to thereby adjust the tilt angle of the signal lobe (and in some cases reduce sidelobe overlap with other antennas) without manually adjusting the physical azimuth or tilt of the antenna 18. This internal tilt adjustment is accomplished by mounting internal antenna elements on a movable backplane and adjusting the backplane with an antenna control unit (ACU) 24 which integrated and controlled through a standard antenna interface protocol known as AISG (Antenna Interface Standards Group). Referring to FIG. 3, the antennas 18 are connected to the local node through amplifiers 26 (TMA—tower mounted amplifiers). A local CNI (control network interface) 28 controls the TMAs 26 and ACUs 24 by mixing the AISG control signal with the RF signal through bias T connectors 30. Each carrier uses the AISG protocols to monitor and control various components within the T/C system from antenna to ground. Antenna maintenance crews can control the electrical tilt of the antennas 18 from the local CNI 28 at the base station 12 and, more importantly, the carrier NOC 16 has the ability to see the various components in the signal path (antenna line devices or ALD's) and to monitor and control operation through the AISG protocols and software.

While this limited phase shift control (electrical downtilt) is somewhat effective at adjusting the coverage area, it is not a complete solution since adjustment of the signal phase of the internal antenna elements often comes at the expense of signal strength and interference of the backward facing transmission lobe with other tower structure and components. In other words, shifting the signal phase provides the limited ability to point, steer or change the coverage area without physically moving the antenna 18, but at the same time significantly degrades the strength of the signal being transmitted or received. Reduced signal strength means dropped calls and reduced bandwidth (poor service coverage). This major drawback is no longer acceptable in T/C systems that are being pushed to their limits by more and more devices and more and more bandwidth requirements.

SUMMARY OF THE INVENTION

Cellular carriers and RF designers have become overly reliant on the internal signal phase adjustments to adjust coverage area to the extent that they are seriously degrading signal quality at the expense of a perceived increase in coverage area or perceived reduction in interference.

A remotely controllable antenna mount for use with a wireless telecommunication antenna provides both mechanical azimuth and mechanical tilt adjustment using AISG compatible motor control units and AISG control and monitoring systems to remotely adjust the physical orientation of the antenna. The mount control units are serially interconnected with existing AISG antenna control units (ACU's) which adjust internal electronic tilt of the antenna. The present solution provides the ability to both physically aim the antenna to adjust coverage area and also adjust the signal phase to fine tune the quality of the signal.

An exemplary embodiment of the present antenna mount includes a structure side interface and an antenna side interface which are rotatable relative to each other through upper and lower swivel bearings aligned along a vertical axis. The swivel bearings provide rotatable movement about the vertical axis through a range of azimuth angle positions. An AISG compatible mount azimuth control unit (MACU) has a motor mechanically interconnected with the structure interface and the antenna interface to drive rotatable movement of the antenna through a range of azimuth angle positions. The exemplary embodiment of the antenna mount further includes a mechanical downtilt assembly mechanically interconnected between the antenna interface and the antenna. The mechanical downtilt assembly includes a lower hinge connector connected between a lower portion of the antenna interface and a lower portion of the antenna where the lower hinge connector is pivotable about a horizontal axis. The mechanical downtilt assembly further includes an upper expandable bracket connected between an upper portion of the antenna interface and an upper portion of the antenna where the upper expandable bracket is linearly expandable to pivot the antenna about the lower hinge connector through a range of tilt angle positions. In one exemplary embodiment, the upper expandable bracket comprises a screw-operated scissor assembly and an AISG compatible mount tilt control unit (MTCU) having a motor mechanically interconnected with a turning element of the crew-operated scissor assembly. The MTCU motor is controllable to drive linear expansion of the scissor assembly and corresponding pivoting of the antenna through a range of tilt angle positions. The MTCU is also serially interconnected through bidirectional AISG ports to an AISG control interface for serial remote control of the ACU, the MACU and the MTCU.

A further exemplary embodiment includes a gear drive reduction between the MACU drive pin and the drive gear to increase torque for the drive gear and to slow rotation of the MACU.

Another exemplary embodiment includes an antenna mounting frame having pivot pins on the top and bottom of the frame. The antenna is mounted to the frame and rotation of the frame is driven in the same manner. The scissor drive is replaced with a linear drive system which resides in a sub-frame received within the antenna frame. The frame may include a fixed pivot hinge on the lower portion of the frame. The linear drive system includes a linear drive block which rides on two spaced guide rods. The MTCU drives a threaded drive rod received through the drive block to drive linear up and down motion of the linear drive block. The top of the antenna is secured to a pivot hinge on the drive block through a tilt arm. It can therefore be seen that linear upward movement of the drive block extends the tilt arm and pushes the top end of the antenna outwardly to provide a controlled downtilt of the frame and antenna. The rigid antenna frame improves rotational stability of the system while the linear tilt drive also improves stability of the system.

Some embodiments may include a linear actuator drive mounted on the pivoting mast. Other embodiments may include a linear actuator drive rod pivotally connected on one end to the mast and at the other end to the upper antenna interface. The MTCU drives the threaded drive rod of the linear actuator. Extension of the drive rod pushes the top end of the antenna outwardly to provide a controlled downtilt of the antenna relative to the mast.

Operational methods of the control system include selectively controlling either or both of the MACU and the MTCU in conjunction with the ACU to both physically orient the antenna and to adjust the electrical downtilt through a common interface.

Some operational methods include grouping related sites and/or antennas, defining one or more configurations of the physical orientation and electrical downtilt of said grouped sites and/or antennas, and selectively controlling movement of said antennas between said configurations. The selectively grouping methodology allows antenna operators to selectively adjust physical coverage areas in times of need, such as for special events, i.e. sporting events, or simply for varying needs at different times of day, i.e. rush hour traffic patterns.

Accordingly, there is provided a unique and novel antenna mount and control configuration which is highly desirable for easy adjustment of antenna coverage, which reduces costs of tower visits, and which reduces the liability of tower climbing crews for manual adjustment of antenna orientation.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

DETAILED DESCRIPTION OF THE INVENTION

Figure 1:
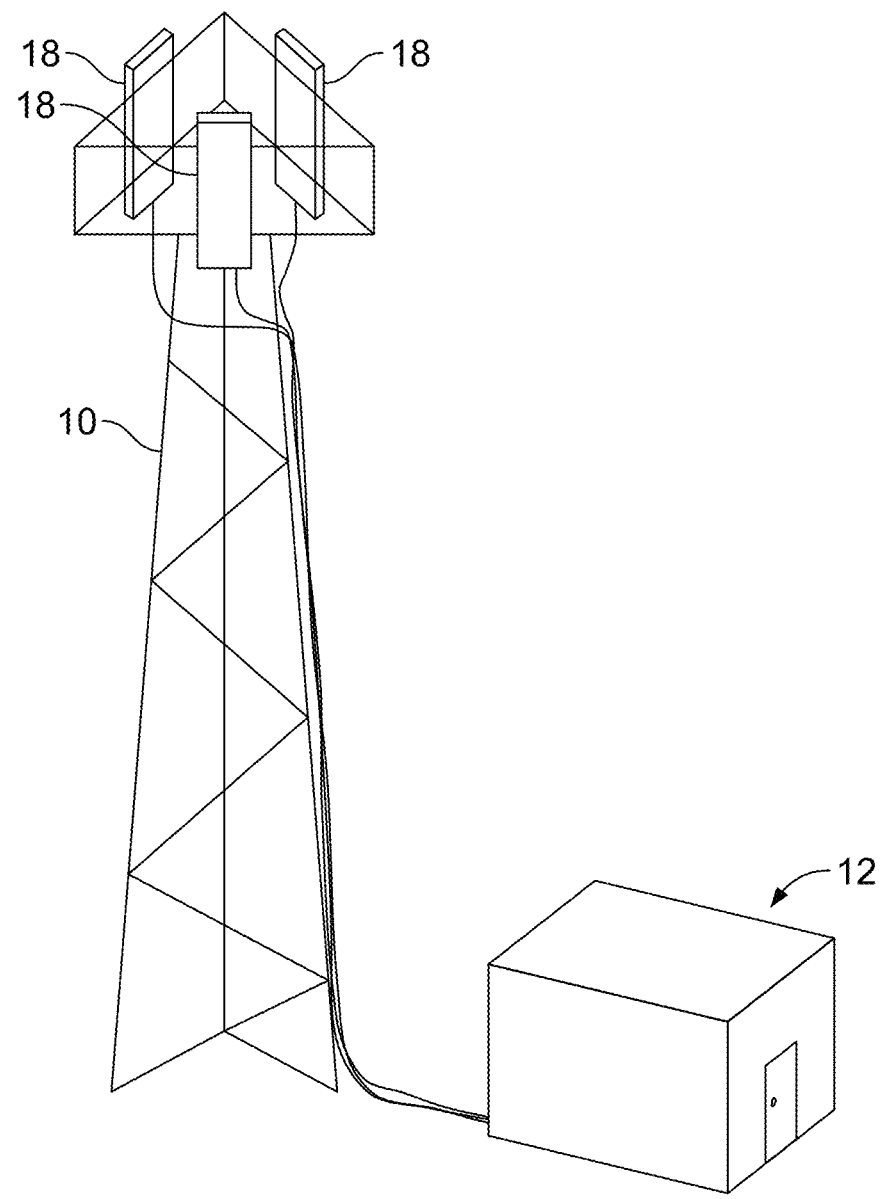
FIG. 1 is a schematic illustration of a telecommunication tower installation.

Referring now to the drawings, an exemplary embodiment of the invention is generally indicated at 100 in FIGS. 4-9. Generally, the remotely controllable antenna mount 100 is particularly useful with a wireless telecommunication antenna 102 to provide mechanical azimuth and/or tilt adjustment using AISG compatible motor control units and AISG control and monitoring systems to remotely adjust the physical orientation of the antenna 102.

Antenna 102 may comprise any commercially available telecommunication antenna from any carrier, operating over any communication bandwidth. The antenna generally comprises a housing 102A and rearwardly facing upper and lower connection brackets 102B, which have a horizontal hinge connection 102C. The antenna connection brackets 102B generally have a standard spacing, but there is significant variation from each manufacturer depending on the antenna size and configuration. For ease of description, the exemplary antenna 102 comprises a single band antenna having a single Antenna Control Unit (ACU) 104 controllable from the local base station 12 and/or carrier NOC 16.

As will be described further hereinbelow, the mount AISG control units are serially interconnected with AISG antenna control units (ACU's) 104 which adjust internal electronic tilt of the antenna 102. The present invention therefore provides the ability to both physically aim the antenna to adjust coverage area and also adjust the signal phase to fine tune the quality of the signal.

An exemplary embodiment of the present antenna mount 100 includes an azimuth adjustment assembly generally 106 having a structure side interface 108 which is configured to be mounted to a mounting pole 110 or other structure, and an antenna side interface 112 which is configured to be mounted to the antenna 102. As indicated above, many antennas 102 are mounted on towers and monopole structures which provide a vertical pole 110 for mounting of the antenna 102. While the exemplary embodiments described herein are intended for mounting on a pole structure 110, the scope of the invention should not be limited by these illustrations. The structure side interface 108 can be adapted and modified as needed to be secured to many different types of structures, and could include brackets, connectors, magnets, etc. as needed for flat surfaces, curved surfaces, etc.

Figure 4A:
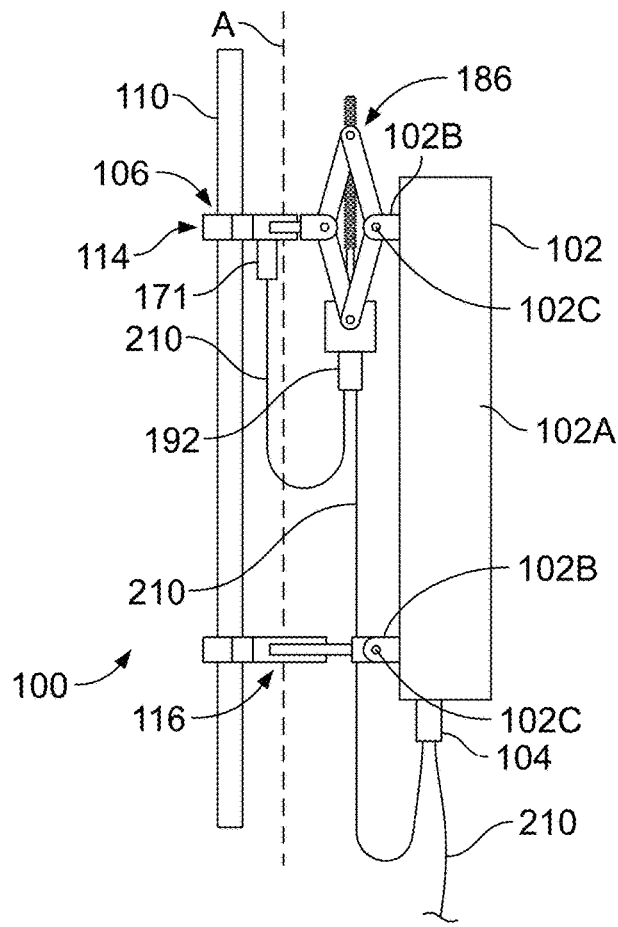
FIG. 4A is a side view of an exemplary embodiment of the present invention.
Figure 4B:
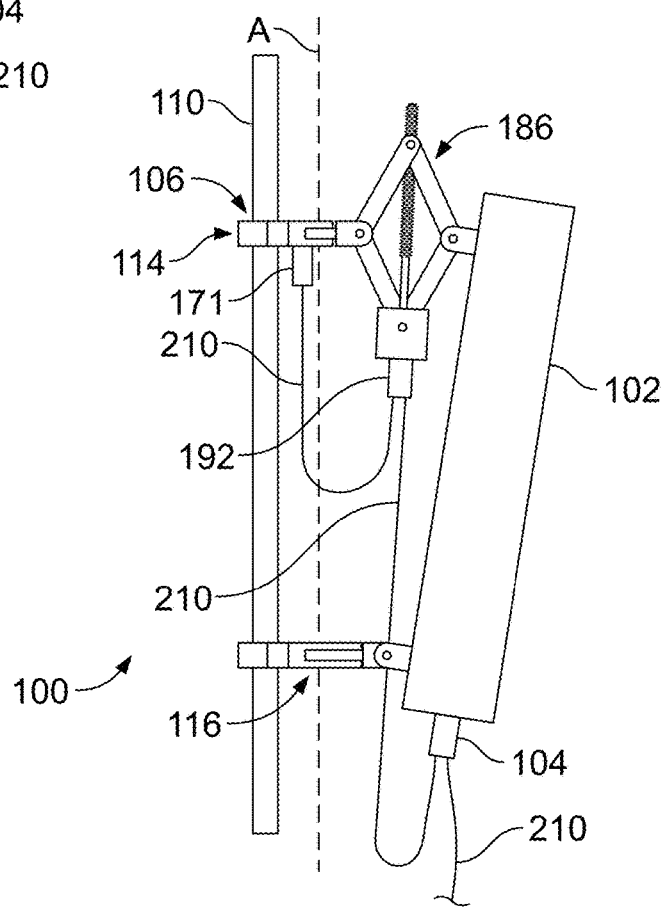
FIG. 4B is another side view thereof with the downtilt assembly extended.
Figure 6A:
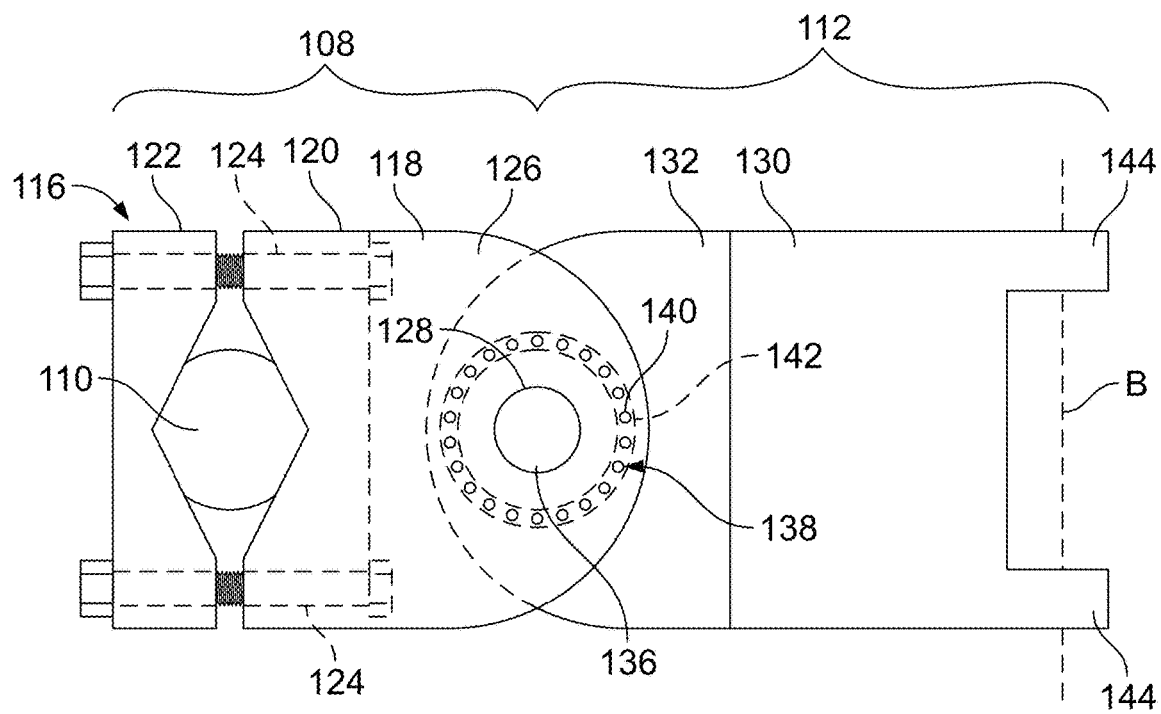
FIG. 6A is a top view of the structure side interface and azimuth adjustment mechanism on the bottom mount bracket.
Figure 6B:
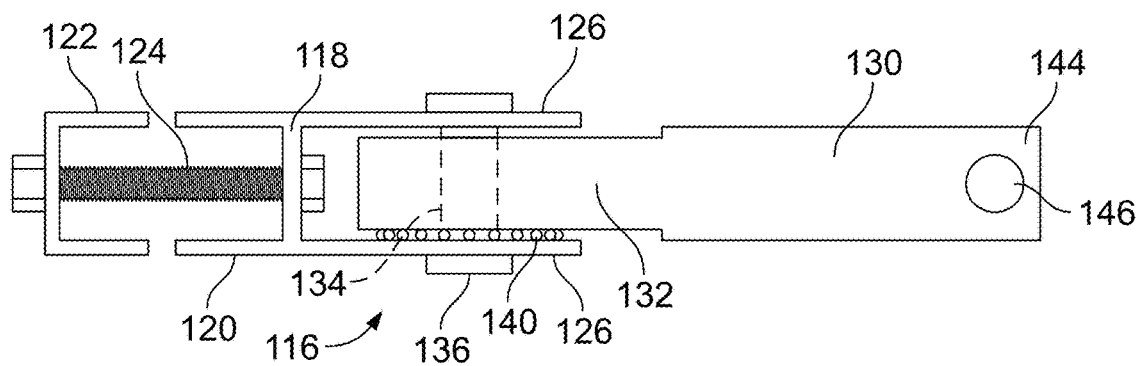
FIG. 6B is a side view thereof.

The structure side interface 108 and the antenna side interface 112 are rotatable relative to each other through upper and lower swivel connections aligned along a vertical axis A (see FIGS. 4A and 4B). The upper and lower portions of the mount 100 are generally separated into two discreet upper and lower units 114 and 116 to provide the ability to adjust the location of the mount portions relative to the back of the antenna 102. As described above, while most antennas 102 have a standard connection spacing, there is a significant amount of variability and thus a need to have the two portions of the mount separate. However, if designed for a single standard size spacing which is known, the upper and lower portions of the structure side interface 108 could be connected by an elongate body to provide a single unit. The same is true for the antenna side interface 112. Turning first to FIGS. 6A and 6B, the structure side interface 108 of lower portion 116 of the azimuth adjustment assembly 106 includes a body 118 having a clamp portion 120 facing the pole 110 and a complementary opposing clamp 122. These elements 120, 122 are clamped and secured around the pole 110 with bolts 124 as is known in the art. Extending from the opposite side of the main body 118 are opposing swivel flanges 126 with a pivot hole 128 which is aligned with the vertical swivel axis A. The antenna side interface 112 comprises a body 130 having a swivel plate 132 extending between the swivel flanges 126. The swivel plate 132 also includes a pivot hole 134 aligned with the pivot hole 128 in the flanges. A pivot pin 136 extends through the pivot holes 128 and 134 and secures the plate 132 and flanges 126 together for rotation. In order to facilitate rotation about the pivot 136, the assembly is provided with a swivel bearing 138 surrounding the pivot holes 128, 134. In this exemplary embodiment, the swivel bearing 138 comprises a plurality of bearings 140 received in facing channels 144 on the flanges 126 and plate 132. However, other closed bearing configurations are contemplated. Extending from the opposite side of body 130 are a pair of connector arms 144 having horizontally extending through holes 146 which define a hinge that is connected to a corresponding hinge connector 102C on the bottom end of the antenna 102. This connector arms 144 thus define the fixed horizontal downtilt axis B (FIG. 6B) for the downtilt assembly.

Figure 5A:
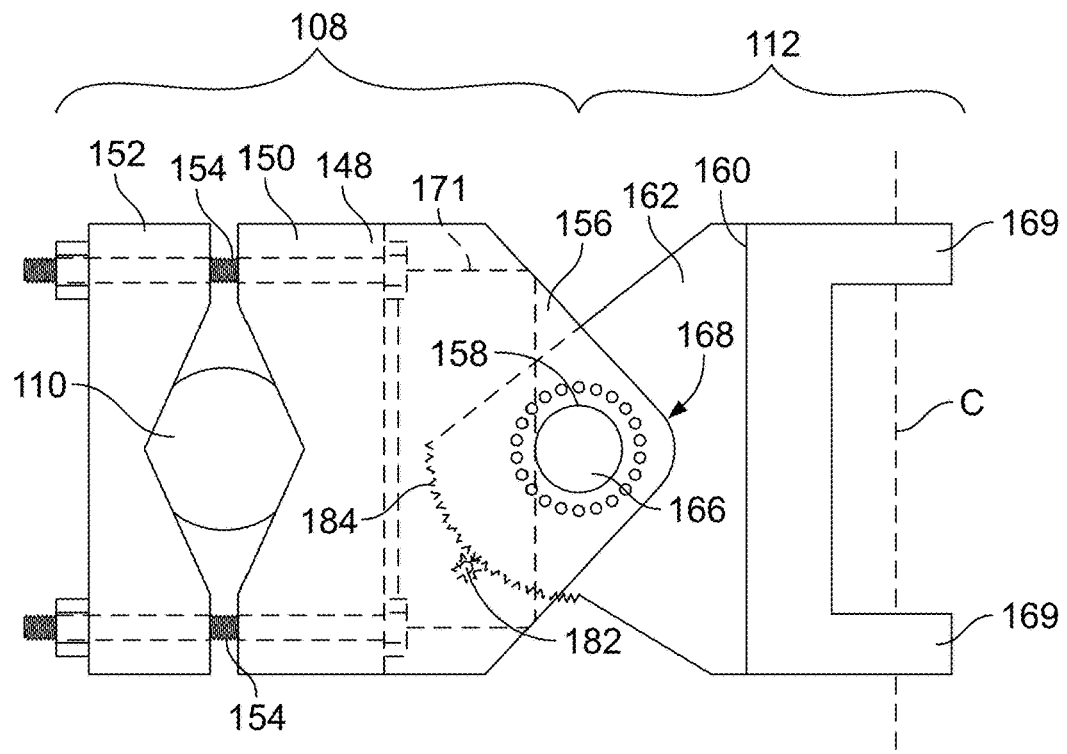
FIG. 5A is a top view of the structure side interface and azimuth adjustment mechanism on the top mount bracket.
Figure 5B:
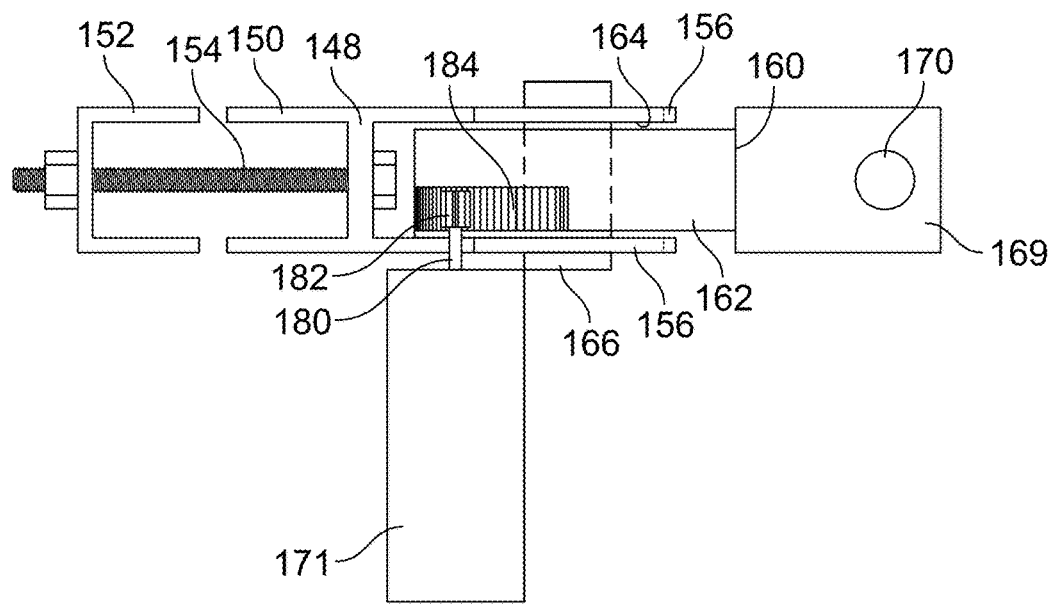
FIG. 5B is a side view thereof.

Turning to FIGS. 5A and 5B, the structure side interface 108 of the upper portion 116 of the azimuth adjustment assembly 106 also includes a body 148 having a clamp portion 150 facing the pole 110 and a complementary clamp 152. These elements are clamped and secured around the pole 110 with bolts 154 as is known in the art. Extending from the opposite side of the main body 150 are opposing swivel flanges 156 with a pivot hole 158 which is aligned with the vertical swivel axis A. The antenna side interface 112 comprises a body 160 having a swivel plate 162 extending between the swivel flanges 156. The swivel plate 162 also includes a pivot hole 164 aligned with the pivot hole 158 in the flanges 156. A pivot pin 166 extends through the pivot holes 158, 164 and secures the parts together for rotation. In order to facilitate rotation about the pivot, the upper assembly is also provided with a swivel bearing 168 surrounding the pivot holes 158, 164. The aligned swivel bearings 138, 168 provide rotatable movement about the vertical axis A through a range of azimuth angle positions. Extending from the opposite side of body 160 are a pair of connector arms 169 having horizontally extending through holes 170 which define a hinge that will be coupled to a corresponding hinge connector 102C on the top end of the antenna 102. These connector arms 169 thus define an upper fixed horizontal axis C (FIG. 6B) for the downtilt assembly.

An AISG compatible mount azimuth control unit (MACU) 170 is mechanically interconnected with the structure interface (body 148) and the antenna interface (body 160) to drive rotatable movement of the antenna 102 through a range of azimuth angle positions.

In this exemplary embodiment, the upper portion 114 is provided with the drive mechanism for driving rotation of the assembly. In this regard, the AISG compatible motor control unit (MACU) 171 is secured to a lower side of the lower flange 156.

Referring briefly to FIGS. 8A-8D, the exemplary motor control unit 171 is illustrated. The preferred unit is an ACU-A20N control unit manufactured by RFS. This is a standard control unit that comprises a motor 172, an AISG motor control processor 174, and male 176 and female 178 AISG bidirectional ports. The bidirectional ports allow these control units to be serially interconnected and monitored and controlled as a single system. These are the same ACU units 104 which are installed on the antenna 102 to control the internal antenna signal phase. They are operated and controlled with the same software and interfaces already in place at the local Node 14 and/or the carrier NOC 16.

Figure 2A:
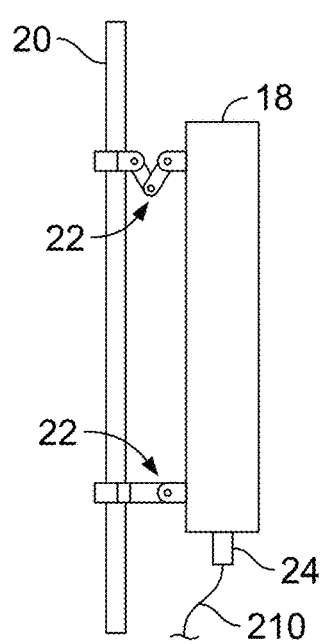
FIG. 2A is an illustration of a prior art antenna and mount including a manual downtilt bracket installed on a mount post.
Figure 2B:
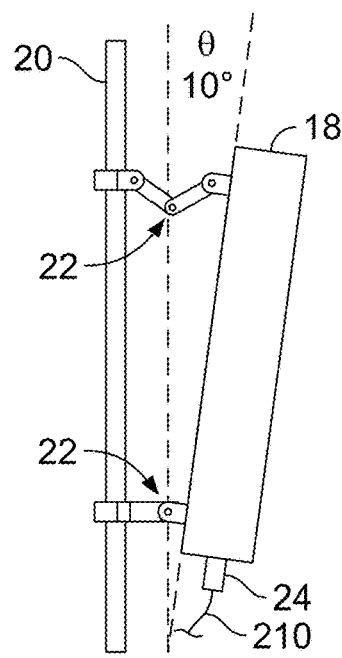
FIG. 2B is a similar illustration thereof with the downtilt bracket extended.
Figure 2C:
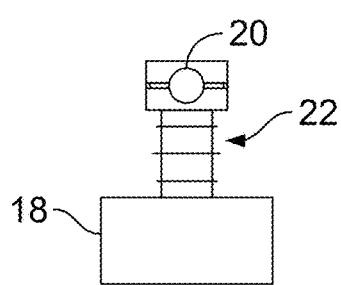
FIG. 2C is a top illustration thereof showing the mount bracket and antenna clamped at a 0° azimuth position.
Figure 2D:
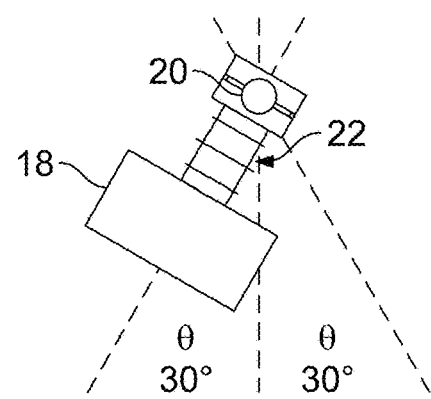
FIG. 2D is another top illustration thereof showing the mount brackets and antenna clamped at a 30° azimuth position.

Referring back to FIGS. 5A and 5B, the drive shaft 180 of the MACU 171 extends up through the lower flange 156 and includes a small drive gear 182. This drive gear 182 is meshed with a larger gear segment 184 provided on the peripheral edge of the swivel plate 162 of the antenna side interface. The drive gears 182, 184 are configured and arranged to provide a neutral 0 position (as shown) and to provide at least a 30° range of movement to either side a 0 (as previously illustrated in FIG. 2D). The gearing to drive rotation may be accomplished by many configurations, and the invention should not be limited by the illustrated configuration.

Figure 7A:
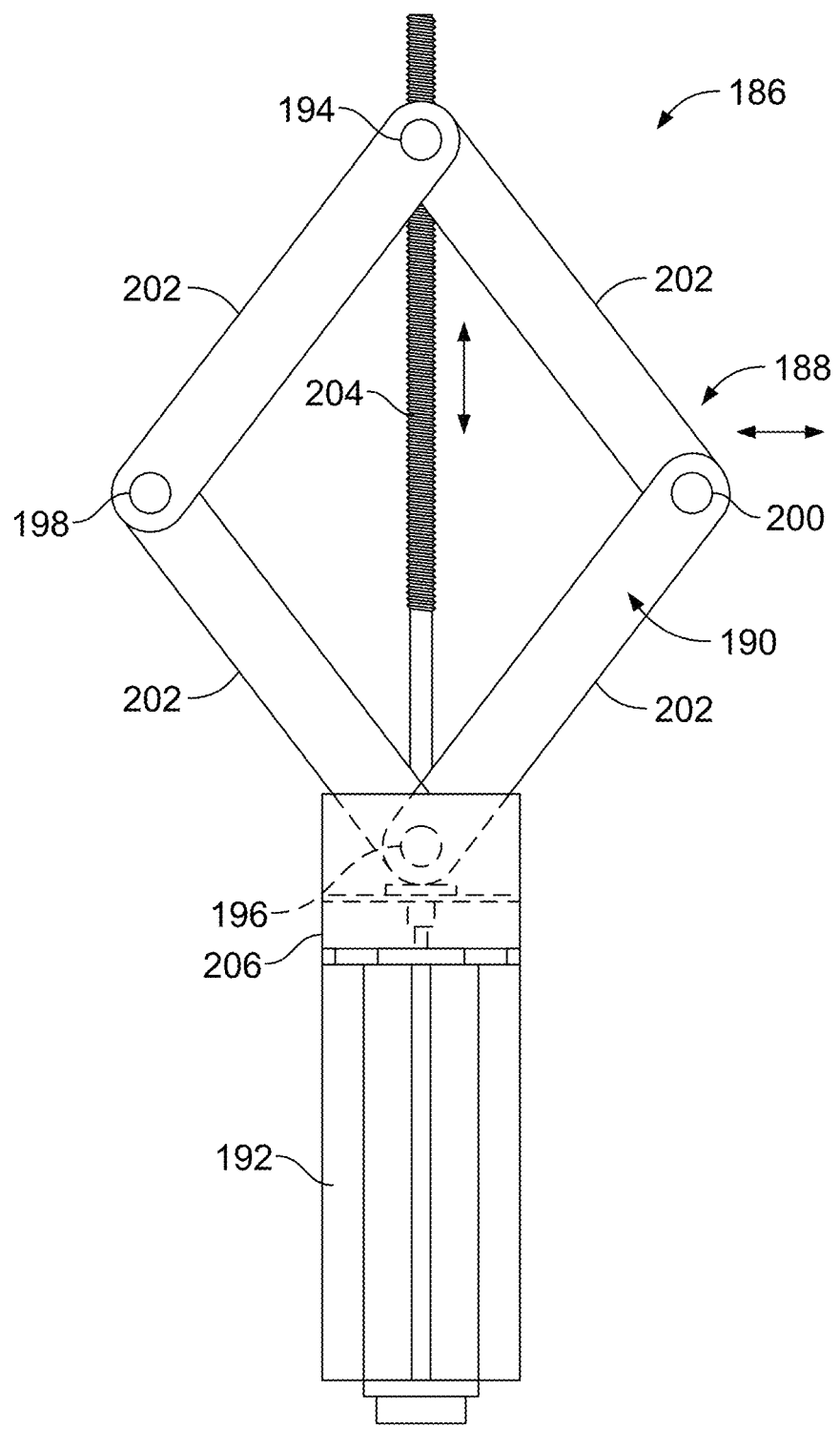
FIG. 7A is an enlarged side view of an exemplary downtilt assembly.
Figure 7B:
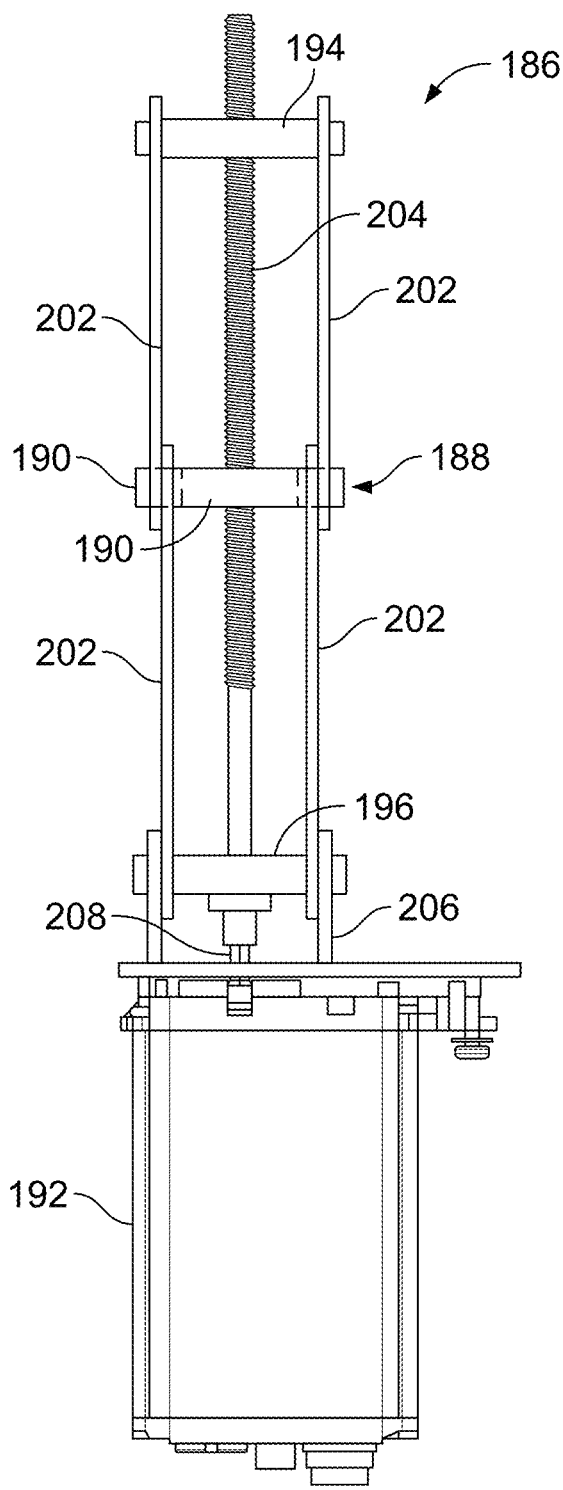
FIG. 7B is a front view thereof.
Figure 8A:
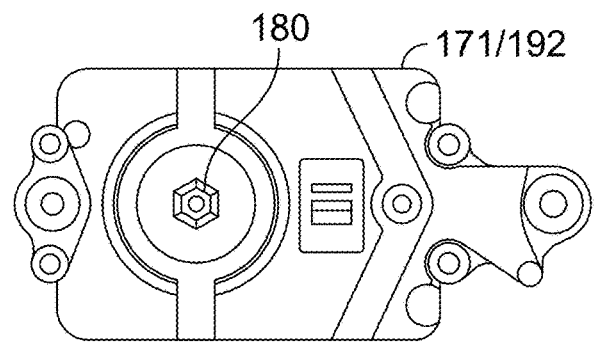
FIGS. 8A-8C are illustrations of an AISG antenna control unit (ACU)
Figure 8B:
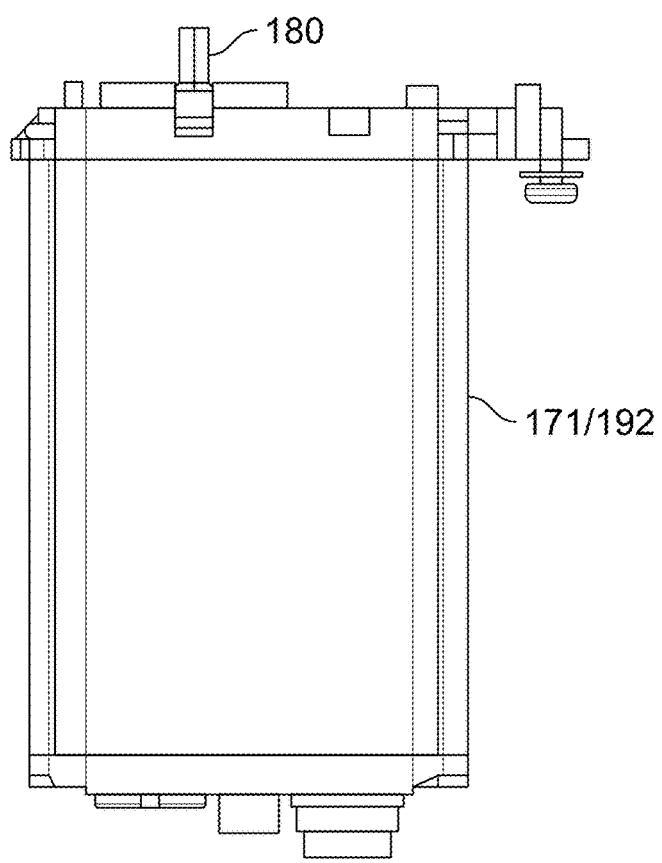
Figure 8C:
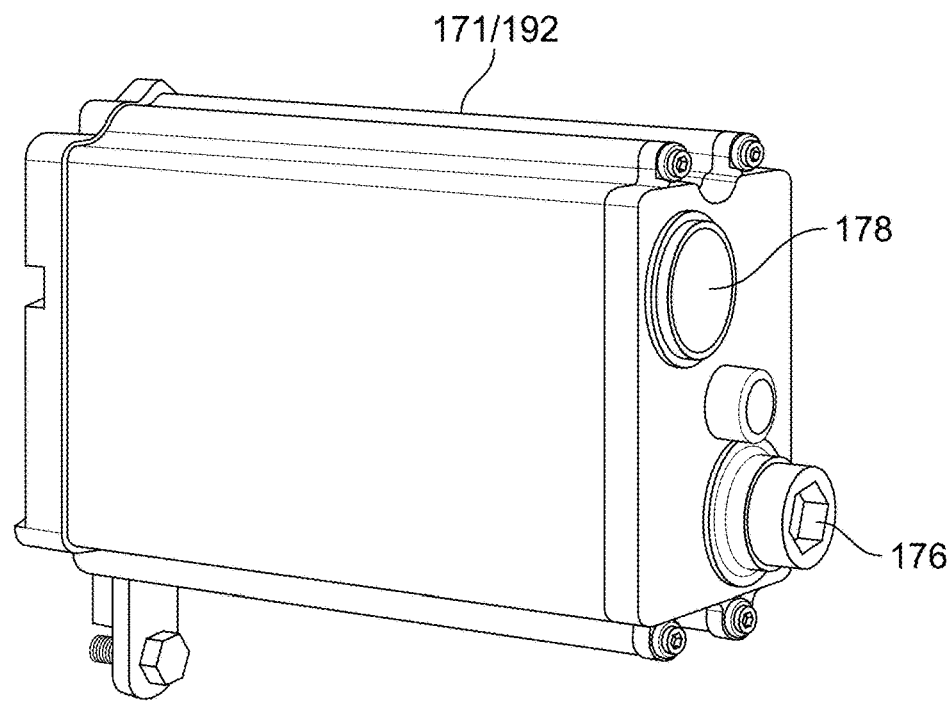
Figure 8D:
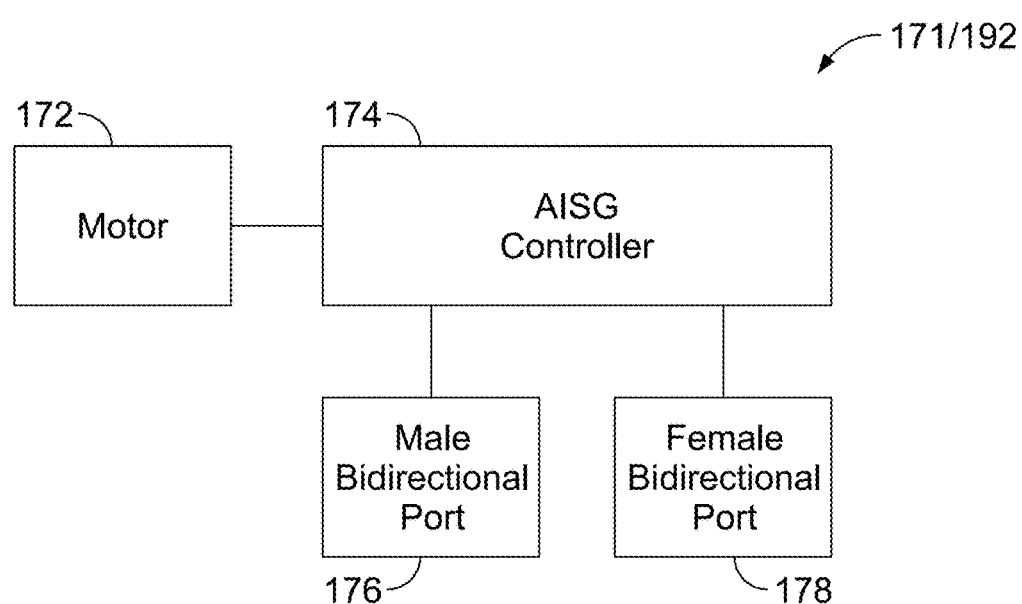
FIG. 8D is a schematic illustration of an ACU.

The exemplary embodiment of the antenna mount 100 further includes a mechanical downtilt assembly 186 mechanically interconnected between the antenna interface 112 and the antenna 102. The mechanical downtilt assembly 186 includes a lower hinge connector 144,146 which was already described as part of the body 130 of the lower mount unit 116. The lower hinge 144, 146 to the lower hinge connector 102C on the lower portion of the antenna 102 where the lower hinge connector 102C is pivotable about horizontal pivot axis B (See FIGS. 6A and 6B). The mechanical downtilt assembly 186 further includes an upper expandable bracket 188 connected between an upper portion 114 of the antenna interface and an upper hinge connector 102C of the antenna 102 where the upper expandable bracket 118 is linearly expandable to pivot the antenna 102 about the lower hinge connector 144 through a range of tilt angle positions (as previously described in FIG. 2B). In the exemplary embodiments, the upper expandable bracket 188 comprises a screw-operated scissor assembly 190 and an AISG compatible mount tilt control unit (MTCU) 192 mechanically interconnected with a turning element of the crew-operated scissor assembly 190. Referring to FIGS. 7A and 7B, the screw operated scissor assembly 190 comprises upper and lower trunnion pivots 194, 196 and opposing side pivots 198, 200. The pivots 194, 196, 198, 200 are connected with scissor arms 202. Lower trunnion 196 is through bored while upper trunnion 194 is threaded. A threaded rod 204 extends through the lower bored trunnion 196 into the upper threaded trunnion 194. A U-shaped motor bracket 206 is secured to the lower trunnion pivot 196 and provides a mounting point for the MTCU 192 which is secured to the lower side thereof. The drive shaft 208 of the MTCU 192 extends through the bracket 206 and engages with the lower end of the threaded rod 204 to provide rotation of the threaded rod 204 and responsive expansion and/or contraction, and resulting linear movement of the side pivots 198, 200. In this regard, the left pivot 198 is an anchor pivot connected to the hinge connector arms 169 on the antenna side interface of the upper swivel assembly 114. The right pivot 200 is connected to the hinge connector 102C on the upper end of the antenna 102.

The MTCU 192 is controllable to drive linear expansion of the scissor assembly 190 and corresponding pivoting of the antenna 102 through a range of tilt angle positions. The MTCU 192 is also serially interconnected through bidirectional AISG ports to an AISG control interface for serial remote control of the ACU, the MACU and the MTCU.

Figure 3:
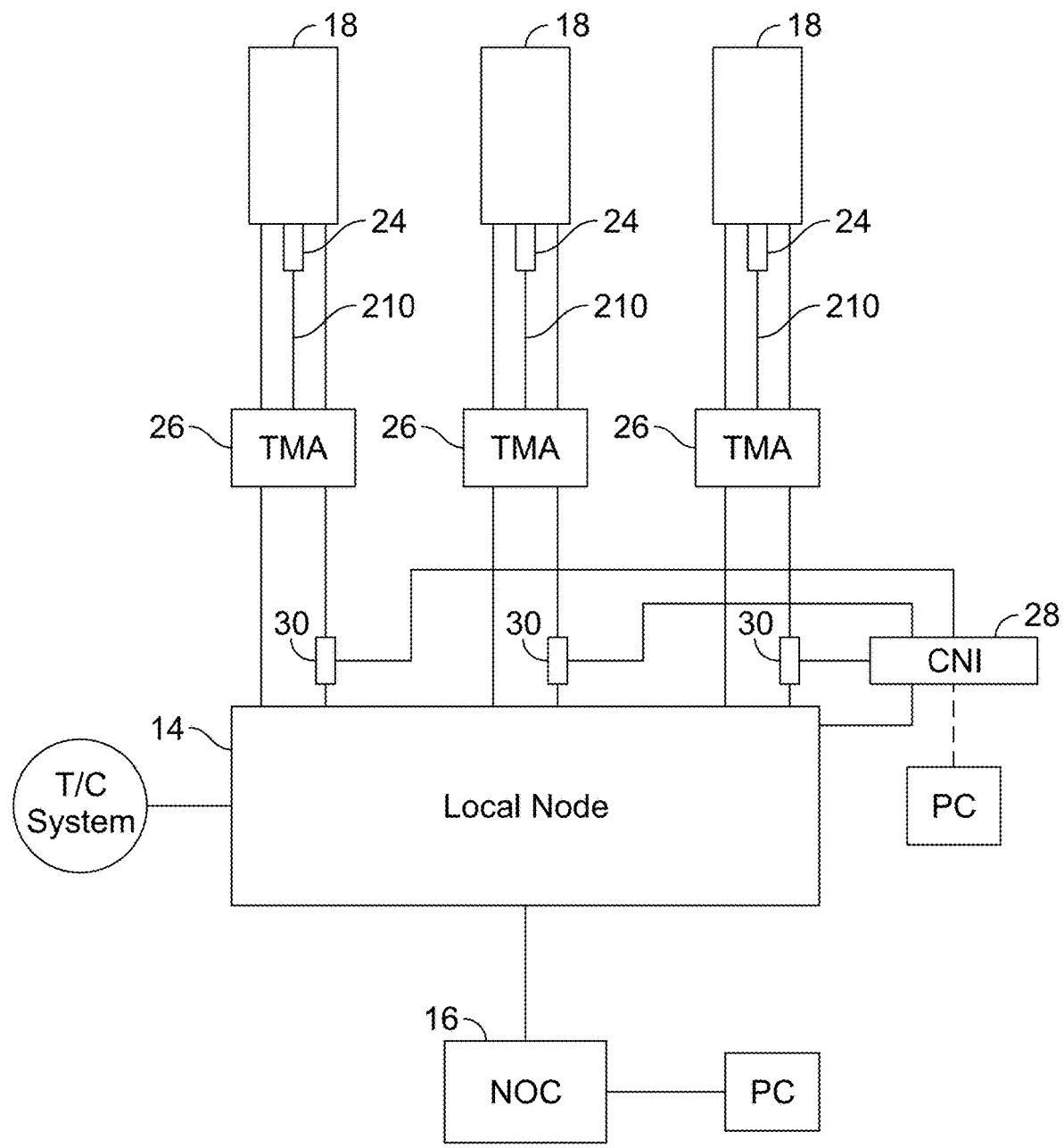
FIG. 3 is a schematic view of a prior art AISG compatible tower installation.
Figure 9:
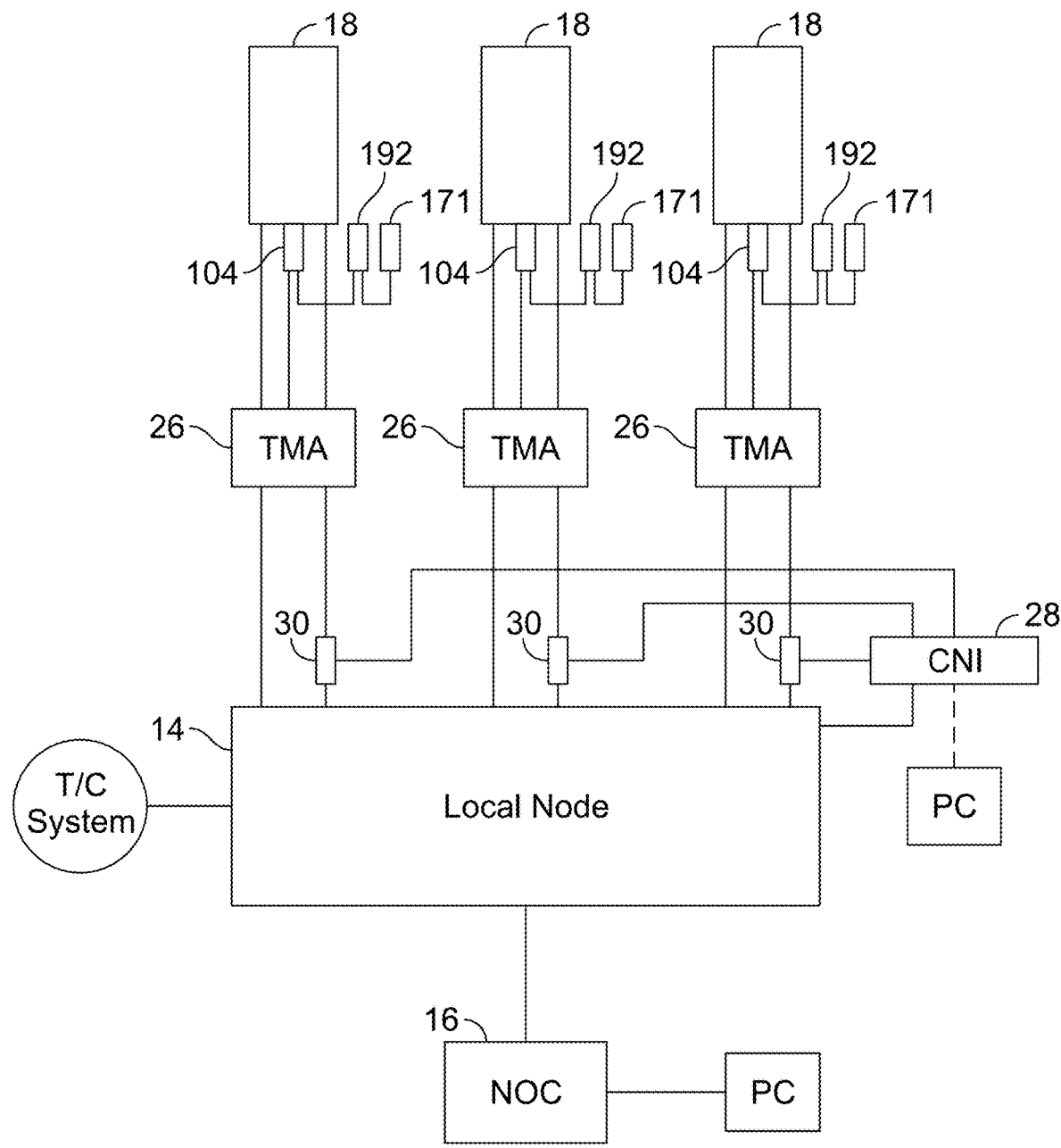
FIG. 9 is a schematic view of an AISG tower installation including 3 antennas and antenna mounts according to the present invention.

Referring to FIGS. 4A, 4B and 9, an exemplary T/C system is illustrated. Similar to FIG. 3, the system includes a plurality of antennas 102, each having an on-board ACU 104. The ACU's 104 are connected to, and can be controlled from, the local CNI 28 and the NOC 16 as previously described. According to the present invention, the MACU 171 and the MTCU 192 are serially connected to the ACU 104 with AISG serial cables 210 to provide serial control of all of the control units 104, 171, 192 through the existing AISG infrastructure.

Figure 10:
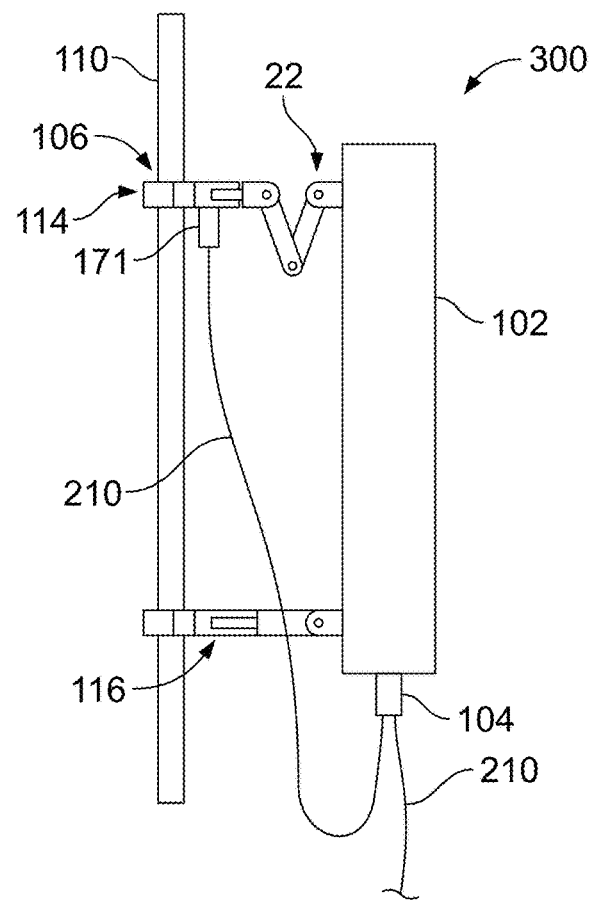
FIG. 10 is a side view of another exemplary embodiment of an antenna mount including a remotely controlled azimuth adjustment assembly and a manual downtilt bracket.

Referring to FIG. 10, another exemplary embodiment is shown comprising a mount 300 that provides only the azimuth adjustment assembly 106 combined with a manual downtilt bracket of the prior art.

Figure 11:
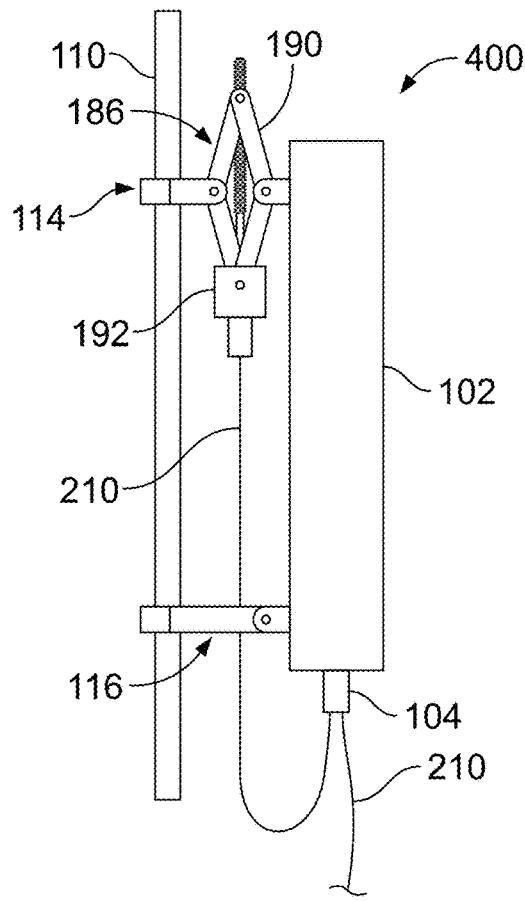
FIG. 11 is a side view of a still another exemplary embodiment of an antenna mount including a remotely controlled downtilt adjustment assembly.
Figure 12:
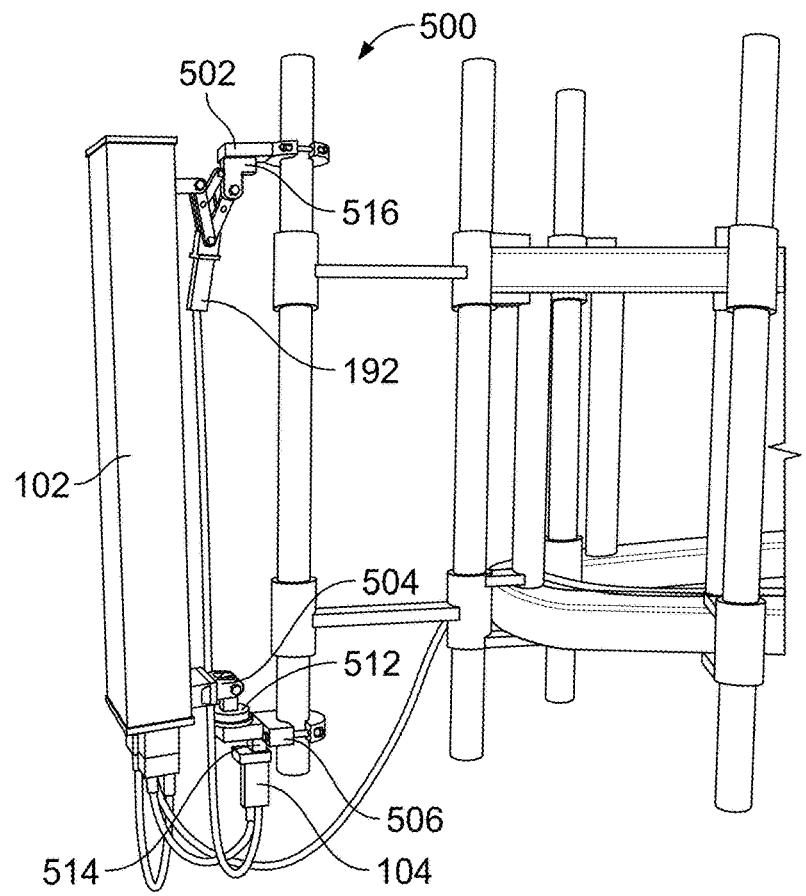
FIG. 12 is a perspective view of another exemplary embodiment including a gear reduction unit.
Figure 13:
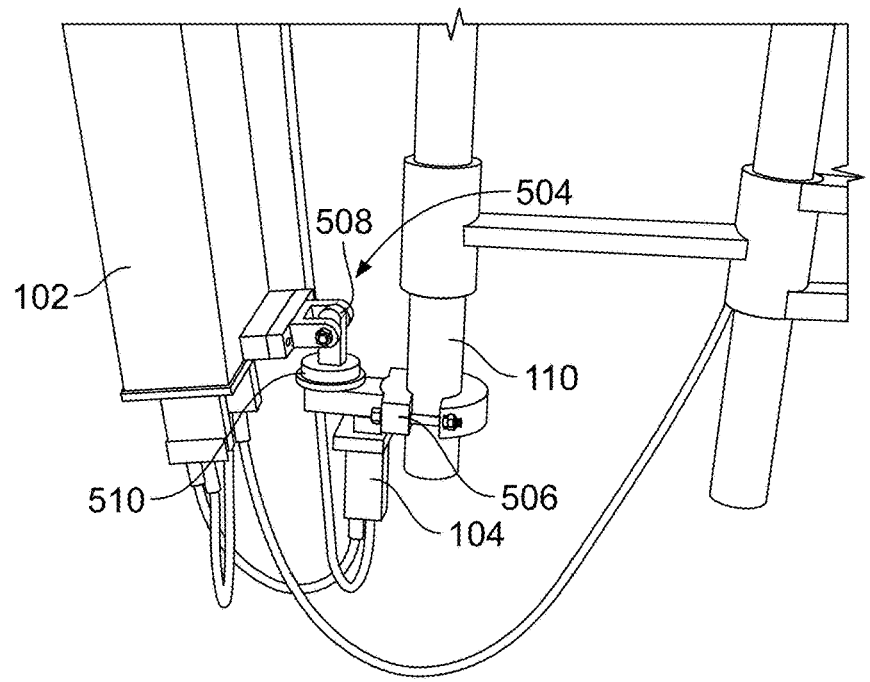
FIG. 13 is an enlarged view of the lower mount assembly.
Figure 14:
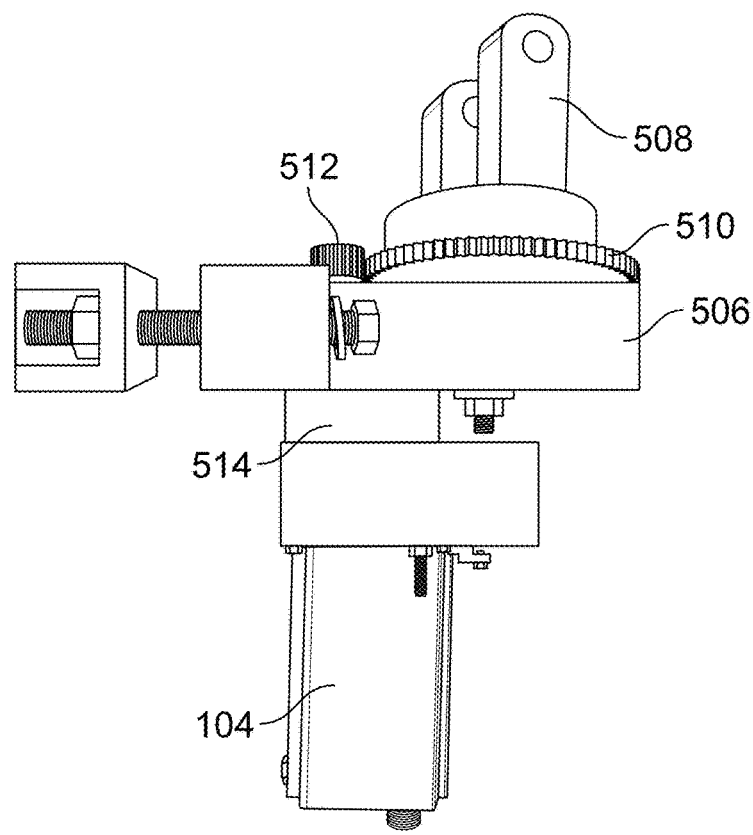
FIG. 14 is another enlarged side view of the lower mount assembly.
Figure 15:
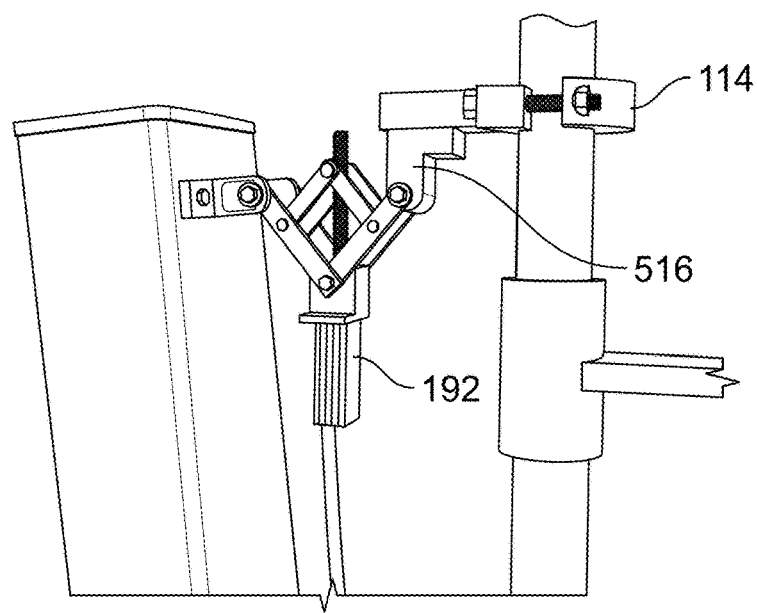
FIG. 15 is an enlarged view of the upper mount assembly.

Referring to FIG. 11, yet another exemplary embodiment is shown comprising a mount 400 that provides only the downtilt adjustment assembly 186 using standard clamping brackets for attachment to the pole 110.

Referring to FIGS. 12-15 another exemplary embodiment 500 is shown comprising both an upper mount 502 with downtilt adjustment and a lower mount 504 with azimuth rotation. The lower mount 504 assembly includes a mount body 506 secured to the pole 110, and a swivel body 508 secured to the lower pivot of the antenna 102. A follower gear 510 is secured to the swivel body 508, and the follower gear 510 is driven by a drive gear 512 having a drive shaft passing through the mount body 506. In contrast to the previous embodiments having a swivel plate which pushed the pivot point of the antenna forwardly of the mount body, the present swivel body 508 provides an antenna pivot point directly over the axis of azimuth rotation of the antenna 102. This arrangement eliminates the significant moment arm from the weight of the antenna extending forwardly from the mount body.

The drive shaft 512 is the output shaft of a gear reduction unit 514 which is secured below the mount body 506. The MACU 171 is coupled to the input end of the gear reduction unit 514 to drive rotation. During prototyping it was found that the standard rotation speed and torque of the MACU unit was not ideal for controlled rotation of the antenna. The speed of rotation was too fast and the torque was lower than desired. The exemplary embodiment utilizes a 9 to 1 gear reduction 514 which provides a sufficient reduction in speed of rotation of the output drive shaft to more precisely control small incremental movements of the antenna without altering the MACU unit 171 or the standard software in place to control the MACU 171. The gear reduction also increases torque which will provide superior power to drive movement of the mount if snow or ice are accumulated on the mount. Further prototyping with different gear assemblies revealed that a direct reduction of about 60-90 to 1 of MACU spindle rotation to swivel body rotation is desirable. The 60-90 plus ger reduction when implemented in a worm gear arrangement also provides self-locking anti-rotation and 0° of backlash to prevent wind from inadvertently rotating the gear reduction and motor. This has been found to be especially important when implementing MACU units using stepper motors. Stepper motors are generally rotatably in both directions when a voltage is not applied across the electrical input. The stepper motors therefore are prone to self-rotation due to vibration and external load, such as wind.

The upper mount 502 and downtilt assembly are generally as previously described above, except that the swivel plate is replaced by a similar swivel body 516.

Figure 16:
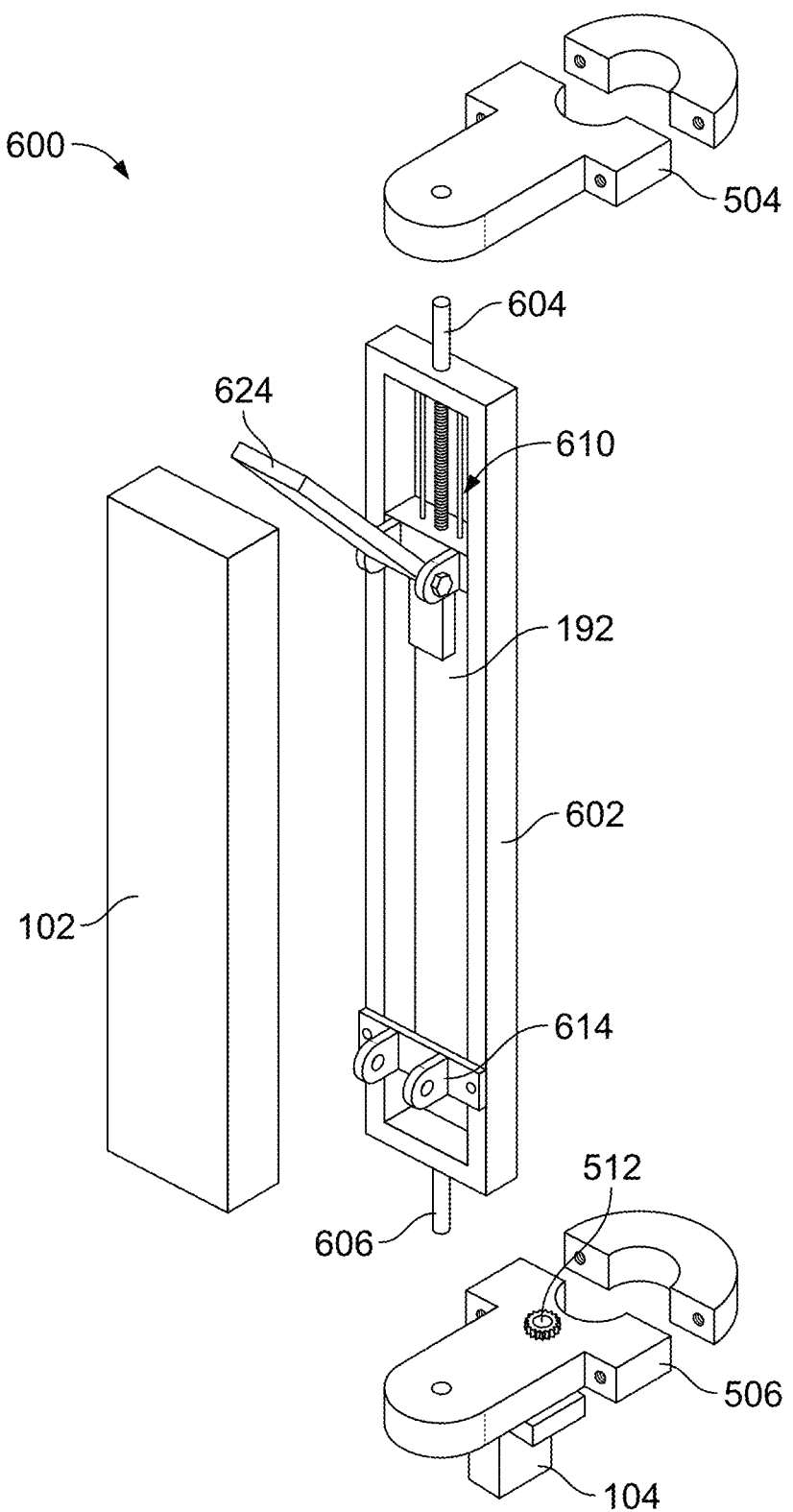
FIG. 16 is an exploded view of yet another exemplary embodiment with an improved back frame and linear drive assembly.
Figure 17:
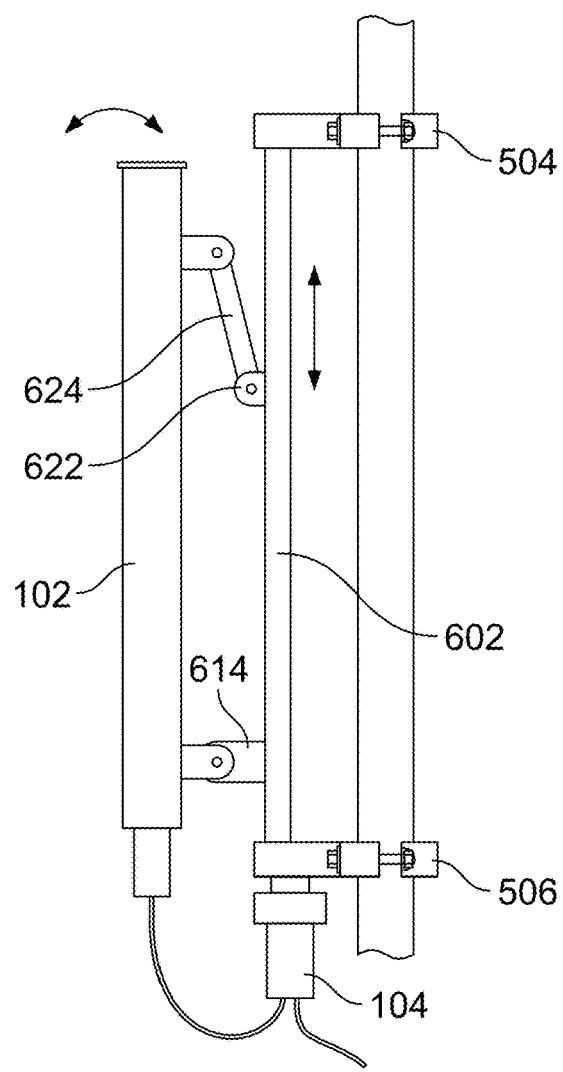
FIG. 17 is a side view thereof.
Figure 18:
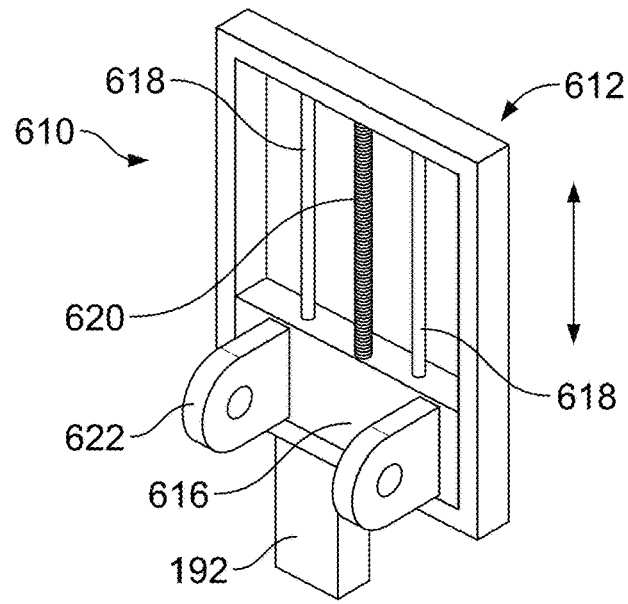
FIG. 18 is an enlarged view of an exemplary linear tilt drive sub-assembly.

Referring now to FIGS. 16-18, yet another exemplary embodiment 600 includes a rectangular antenna mounting frame 602 having pivot pins 604 and 606 on the top and bottom of the frame 602. The antenna 102 is mounted to the frame 602 and rotation of the frame 602 is driven and controlled in the same manner. The lower pivot pin 606 includes a follower gear (not shown) which is driven by the same drive gear 512 drive mechanism shown in FIGS. 12-15. The drive shaft 512 is the output shaft of a gear reduction unit 514 which is secured below the mount body 506. The MACU 171 is coupled to the input end of the gear reduction unit 514 to drive rotation.

The frame 602 provides a rigid stable platform to secure the antenna 102 and reduces upper end wobble associated with using two separate upper and lower swivel bodies. The frame 602 is adaptable in size for different size antennas and can be universally adapted for connection to different antennas using different adapter connections.

The scissor drive 22 is replaced with a linear drive system 610 which may reside in a sub-frame 612 received within the upper portion of the antenna frame 602. The frame 602 includes a fixed pivot hinge 614 on the lower portion of the frame 602. The fixed pivot hinge 614 is adjustable in location along the length of the frame 602 to accommodate different size antennas 102.

The linear drive system 610 includes a linear drive block 616 which rides on two spaced guide rods 618. The MTCU 192 is mounted to the lower portion of the sub-frame 612 and drives a threaded drive rod 620 received through the drive block 616 to drive linear up and down motion of the linear drive block 616. The top of the antenna 102 is secured to a pivot hinge 622 on the drive block 616 through a tilt arm 624 which is also pivotably secured to a bracket on the rear of the antenna. It can therefore be seen that linear upward movement of the drive block 616 extends the tilt arm 624 and pushes the top end of the antenna 102 outwardly to provide a controlled downtilt of the antenna 102. The linear sub-frame 612 is adjustable in location within the main frame 602 for different size antennas and different mounting needs. The upper and lower mount bodies 504 and 506 are still independently adjustable in location on the pole.

The rigid antenna frame 602 improves rotational stability to the system while the linear tilt drive also improves stability of the system. The frame 602 further provides a platform for the installation of other antenna accessories, or more importantly RF shielding material (not shown). It is becoming more evident that RF back lobe emissions are becoming an issue on overcrowded tower structures and carriers are seeking ways to absorb RF emitted from the rear side of their antennas. The frame 602 provides an ideal location for the installation of RF shielding or RF absorbing materials.

Figure 19:
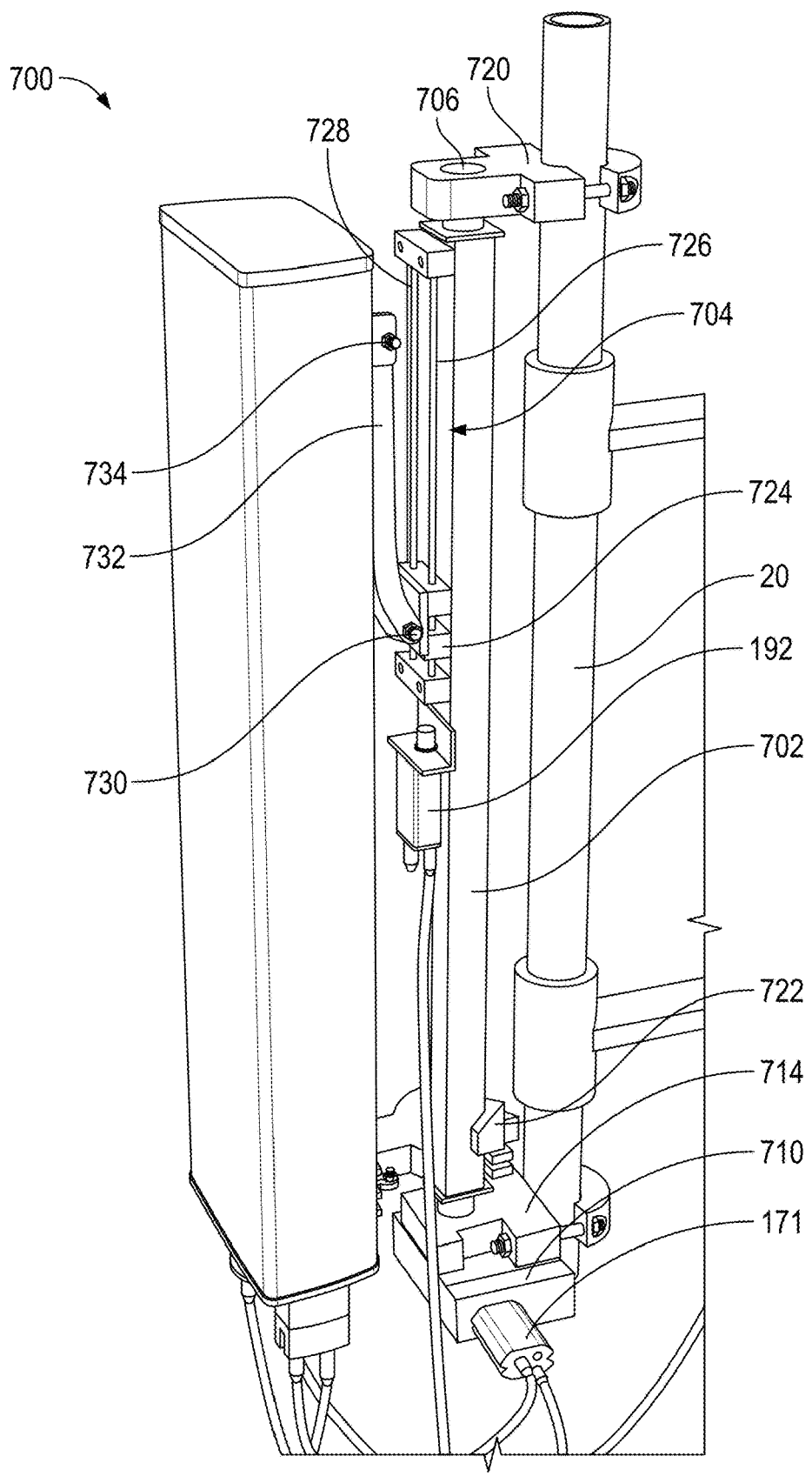
FIG. 19 is a perspective view of yet another exemplary antenna mount assembly include a pivoting mast and linear actuator assembly.
Figure 20:
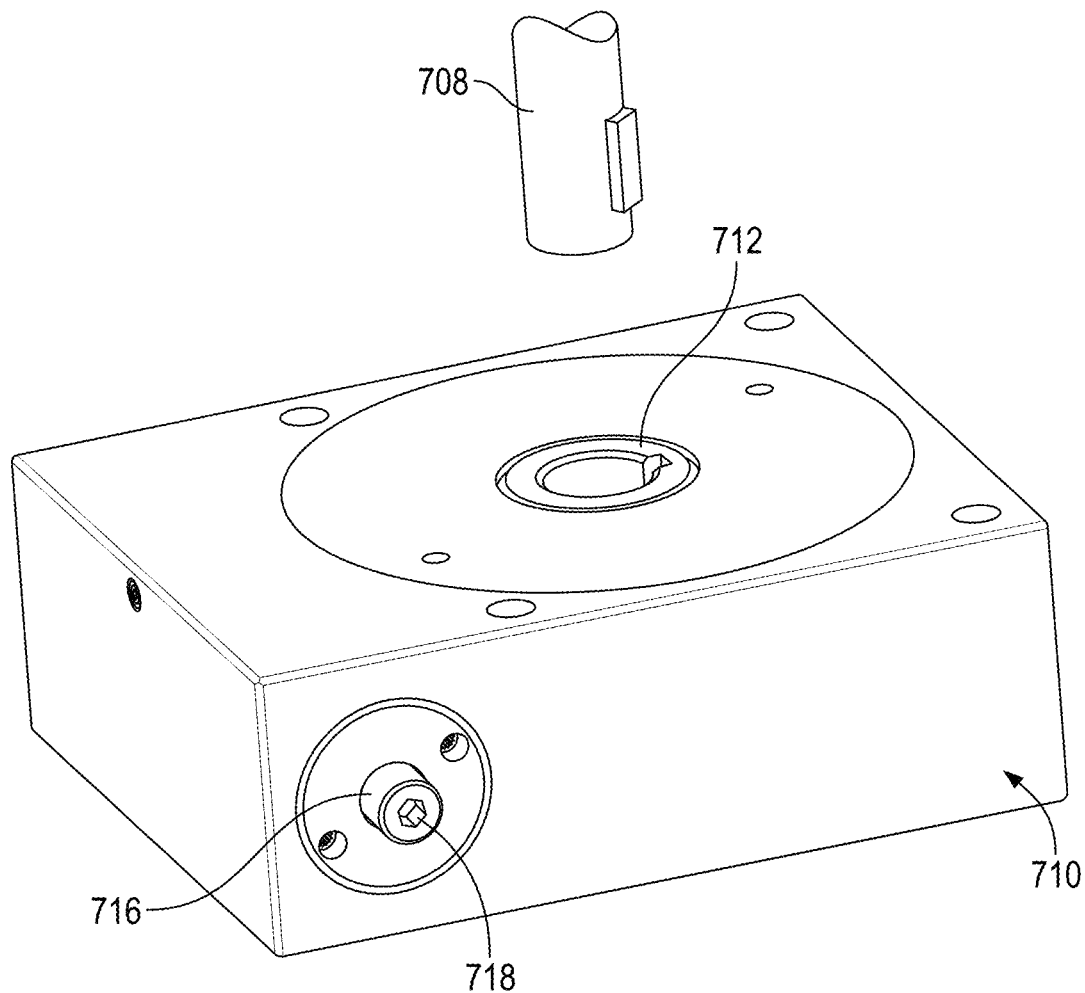
FIG. 20 is an enlarged view of a gear reduction used to drive rotation of the mast in the assembly of FIG. 19.

Referring to FIGS. 19-20, in another exemplary embodiment 700, the frame may be replaced with a linear mast 702 on which linear actuator sub-assembly 704 can be mounted. The mast 702 includes upper and lower pivot pins 706, 708 on the top and bottom of the frame 702. The antenna 102 is mounted to the mast 702 and rotation of the mast 702 is driven and controlled in a similar manner with the MACU 171 and a gear reduction unit 710. The lower pivot pin 708 is a keyed shaft (H20 size—20 mm shaft) which is received into weather-sealed worm gear reduction assembly 710 as best shown in FIG. 20. The gear reduction 710 may preferably comprise a 60 to 1 self-locking worm gear reduction with either reduced or zero backlash. As noted above, this is particularly suitable when used with stepper motor MACU units which tend to move when voltage is not continuously applied. The drive element (output) 712 is a keyed cylinder of the gear reduction unit 710 which is secured below the mount body 714. The keyed shaft 708 extends through the mount body 714 into the keyed output cylinder 712. Mount body 714 is clamped to the mounting post 20 as previously described. The MACU 171 is coupled to the input shaft 716 of the reduction unit 710 to drive rotation. The input shaft 716 is provided with 5 mm hex drive opening 718 to receive the like-sized hex drive pin of the MACU unit 171.

The upper pivot 706 is a similar 20 mm shaft received into a 20 mm bearing (not shown) supported in an upper clamped mount assembly 720 also clamped to mount post 20.

Like the frame 602 above, the mast 702 is adaptable in size for different size antennas 102 and can be universally adapted for connection to different antennas using different adapter connections.

The sub-frame linear drive 610 (above) is replaced with a dual guide linear actuator unit 704 having a backplane which may be secured to a forward face of the mast 702. A lower downtilt pivot bracket 722 is secured to the lower portion of the mast 702. The lower pivot bracket 722 is adjustable in location along the length of the mast 702 to accommodate different size antennas 102.

The linear drive actuator 704 includes a linear drive block 724 which rides on two spaced guide rods 726. The MTCU 192 is mounted to the lower portion of the actuator 704 and drives a threaded drive rod 728 received through the drive block 724 to drive the guide block 724 up and down spaced guide rods. The top of the antenna 102 is secured to a pivot hinge 730 on the drive block 724 through a tilt arm 732 which is also pivotably secured to a bracket 734 on the rear of the antenna 102. The linear upward movement of the drive block 724 extends the tilt arm 732 and pushes the top end of the antenna 102 outwardly to provide a controlled downtilt of the antenna 102 as in the previous embodiment. The linear actuator sub-assembly 704 is adjustable in location on the mast 702 for different size antennas and different mounting needs. The upper and lower mount bodies 714 and 720 are still independently adjustable in location on the mounting pole 20.

Some embodiments of the system may include only the azimuth drive system and either mechanical downtilt brackets or a fixed upper and lower mount brackets, while others may include a fixed azimuth clamp mount and a mechanical downtilt drive mechanism.

In some embodiments, the entire downtilt mechanism may be eliminated to provide an azimuth only adjustment along with electrical downtilt.

Figure 21:
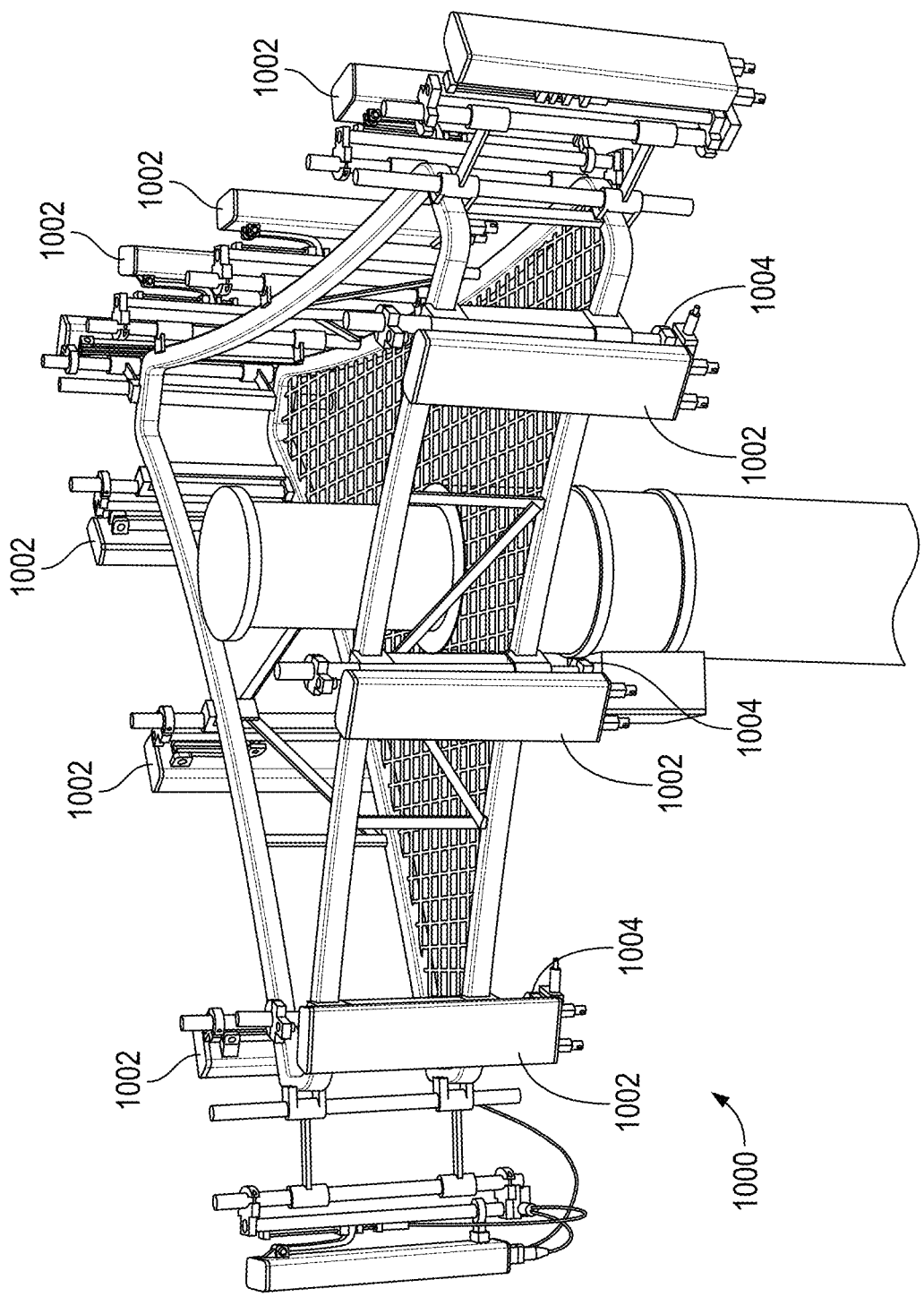
FIG. 21 is a perspective view of a plurality of antennas and mounts mounted in a 3 sector configuration.
Figure 22:
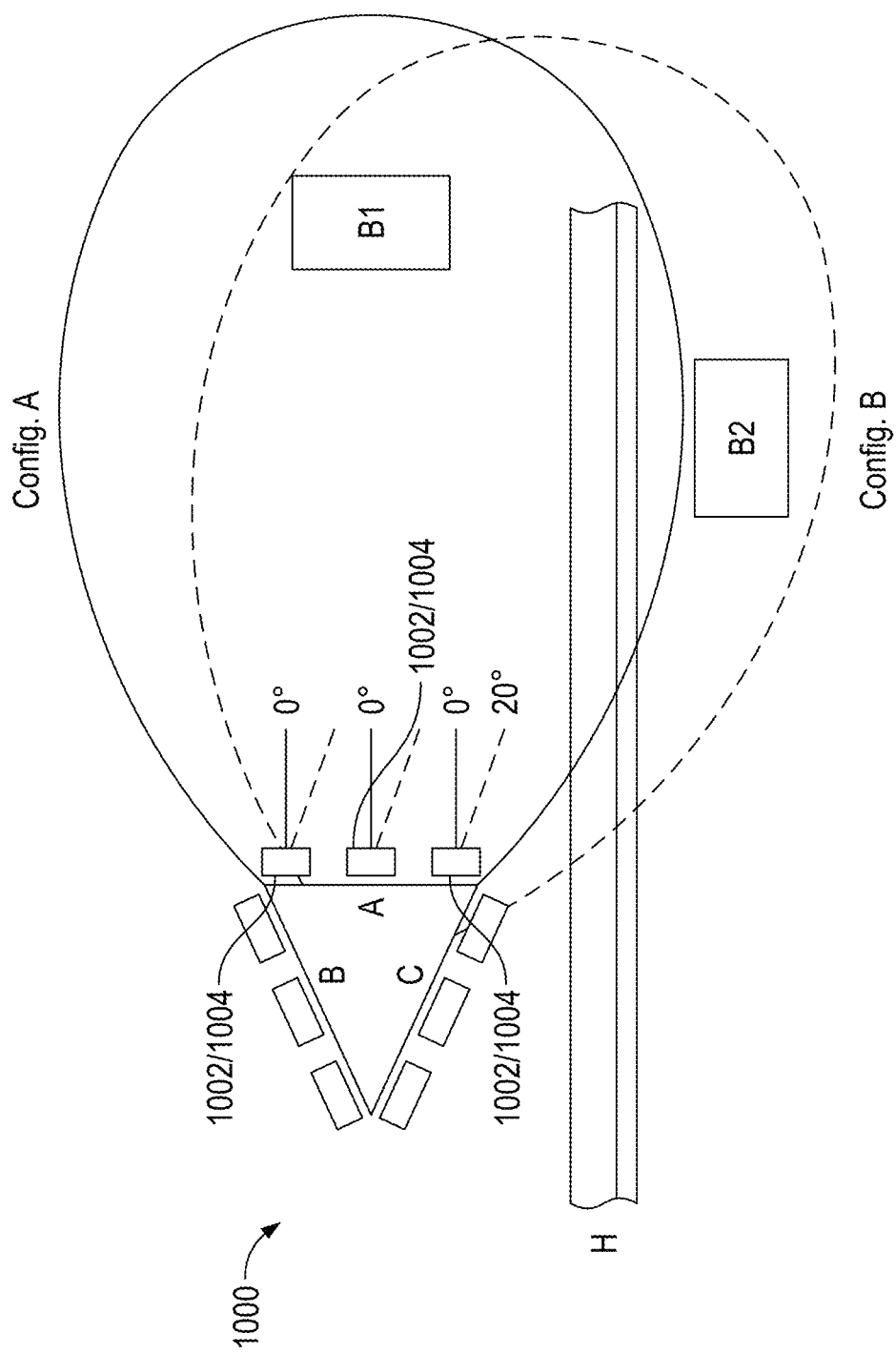
FIG. 22 shows two configurations of the antennas grouped in a single antenna sector.

Turning now to operational improvements, FIG. 21 is a perspective view of an antenna site 1000 having a plurality of antennas 1002 and mounts 1004 mounted in a 3-sector configuration (Sectors A, B, C). In order to fully take advantage of the capabilities of the present antenna mounts 1004 there are described herein methods for grouping control of the antennas 1002 together (in tandem or grouped processing) and defining specific coverage configurations which may be useful in a variety of different operating conditions. For example, the three separate antennas 1002 in a single sector A operating at different wavelengths may be grouped together in a software control platform to provide two different operating modes (Configurations A and B) with different coverage patterns. FIG. 22 illustrates an exemplary site location with two buildings B1 and B2 and a highway H passing therebetween. The illustrated antenna sector A may have a configuration A with a primary coverage area (solid line coverage lobe) focused for the building B1. This coverage configuration could be useful during daytime hours when the building B1 is full with workers. A second Configuration B (dashed line coverage lobe) is rotated 20 degrees to the right where the coverage area better serves the highway H and the building B2 on the opposing side of the highway. This configuration B may, for example, provide better coverage during rush hour or evening hours if building B2 contained restaurants with a higher foot traffic pattern at different hours of the day. In this regard, the three antennas 1002 (and associated mounts 1004) in Sector A could be grouped together and collectively actuated to adjust their physical azimuth orientation with a simple configuration command. AISG commend protocol could be executed in tandem or batch mode to actuate the associated MACU azimuth motor controllers 171 to rotate the physical position of the antennas 1002 to the desired position. Such control and adaptability is impossible with fixed mount antennas. Piggy backed control of the physical orientation of the antenna with the electrical downtilt (and mechanical downtilt) provides a level of control not ever available in the past systems.

Figure 23:
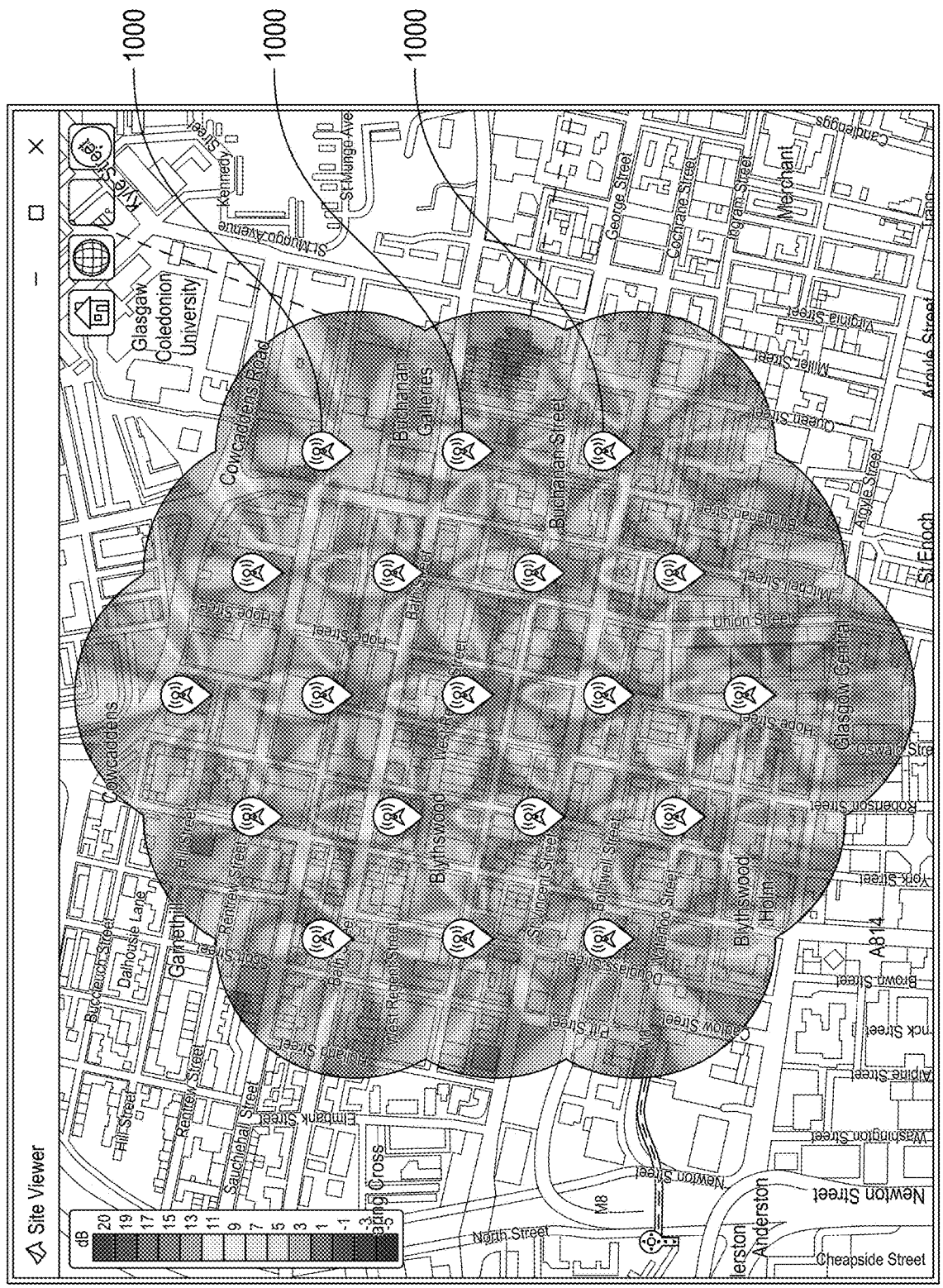
FIG. 23 shows an exemplary configuration of a large array of antenna sites with overlapping coverage areas.

The concept of tandem control and batch movement can be further applied to larger arrays of sites and antennas over even wider areas of coverage. FIG. 23 shows an exemplary configuration of a large array of antenna sites 1000 with overlapping coverage areas.

Figure 24:
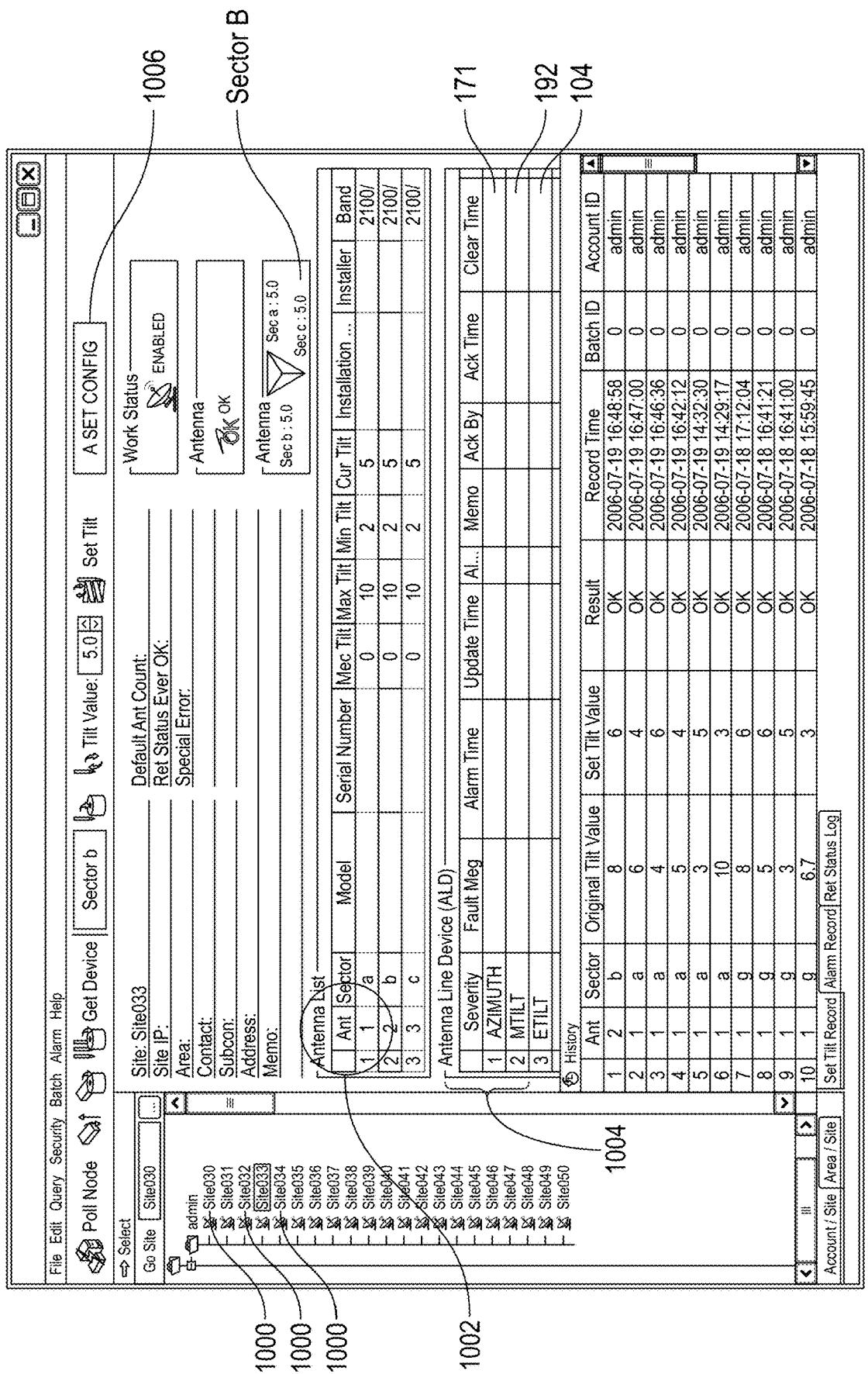
FIG. 24 is an exemplary illustration of an AISG control interface software for identifying various sites and antenna line devices (ALD's) located at each site.

FIG. 24 is an illustration of an exemplary AISG control interface software for identifying various sites 1000 and antenna line devices (ALD's) (ACU 104/MACU 171/MTCU 192) located at each site 1000. By providing an added layer of selection 1006 (see Set Config button), grouping and antenna settings configurations in memory, the system becomes infinitely adaptable to many different scenarios, all of which can be quickly and remotely implemented without climbing the tower. FIG. 24 illustrates the interface allowing selection of a site 1000 and the ability to see individual Antenna Line Devices (ALD's) at each site 1000 and within each defined sector, and within each mount assembly 1004.

Figure 25:
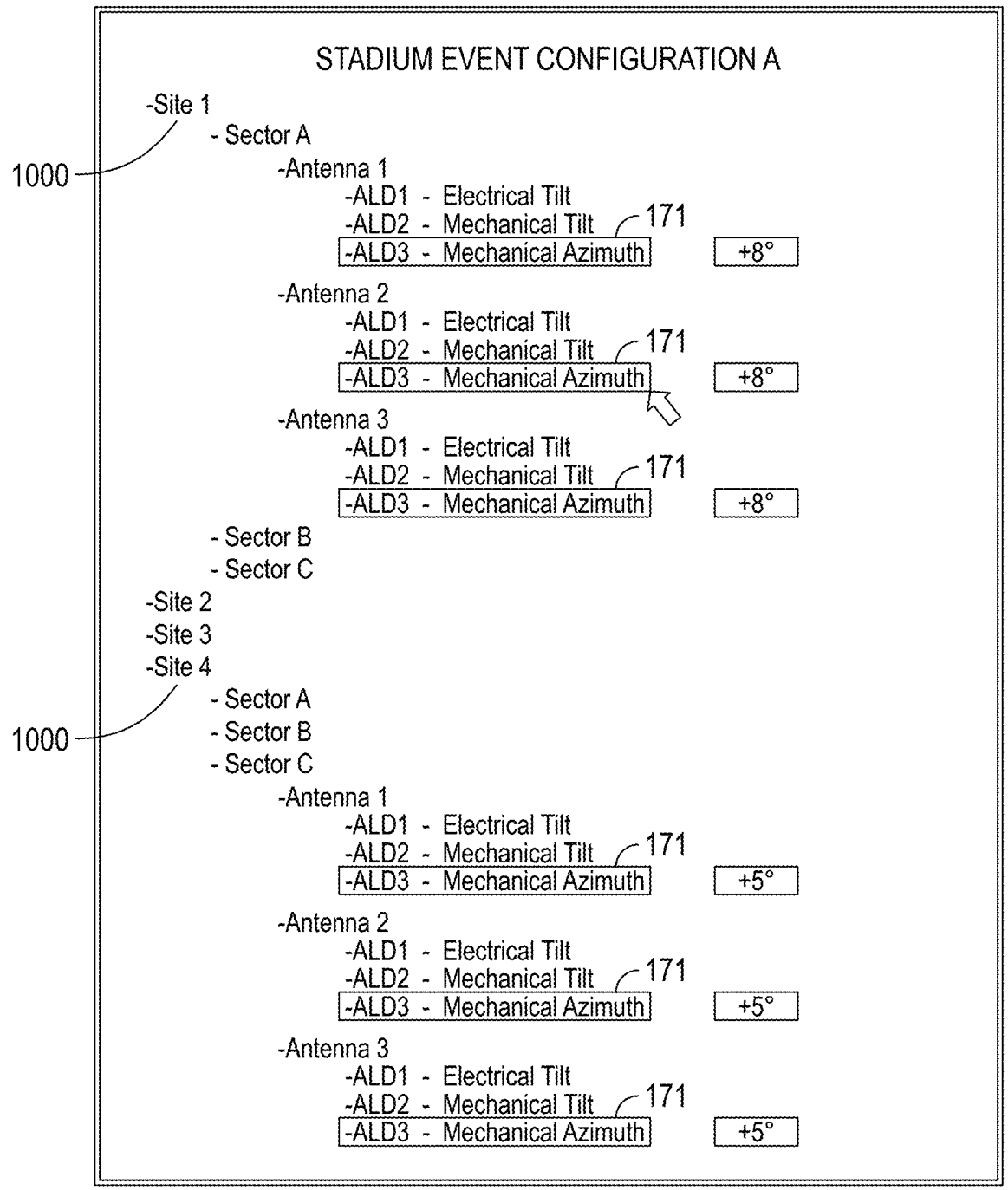
FIG. 25 illustrates the methodology of selecting ad grouping various ALD's from different antenna sites to define various coverage configurations.
Figure 26:
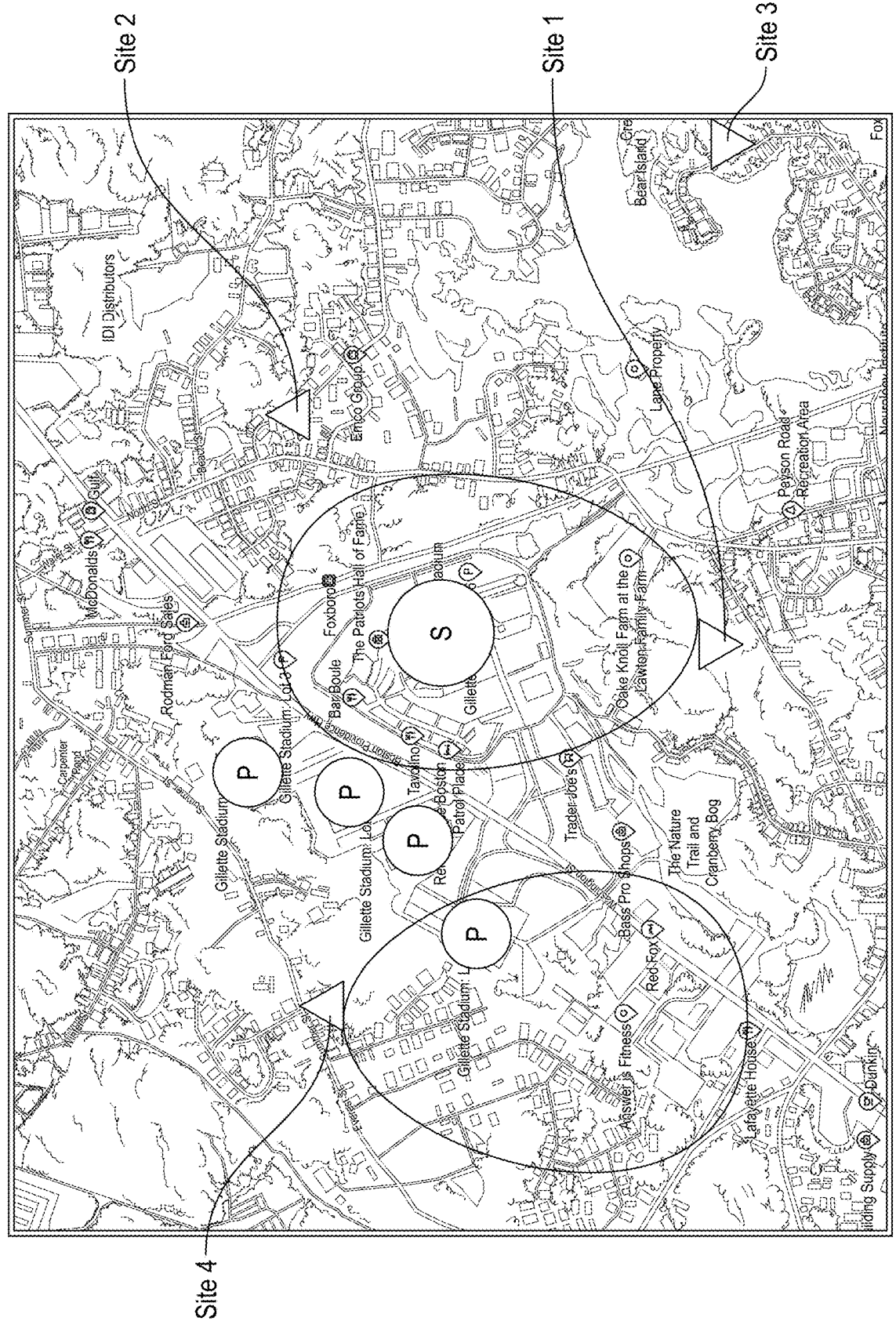
FIGS. 26 and 27 illustrate exemplary coverage configurations for a normal everyday coverage configuration (FIG. 26) and an "event" configuration pattern (FIG. 27) which adjusts the azimuth angle of various antennas in facing sectors of the antennas to move the coverage pattern more closely toward parking lots of a stadium to better cover parking areas during an event.
Figure 27:
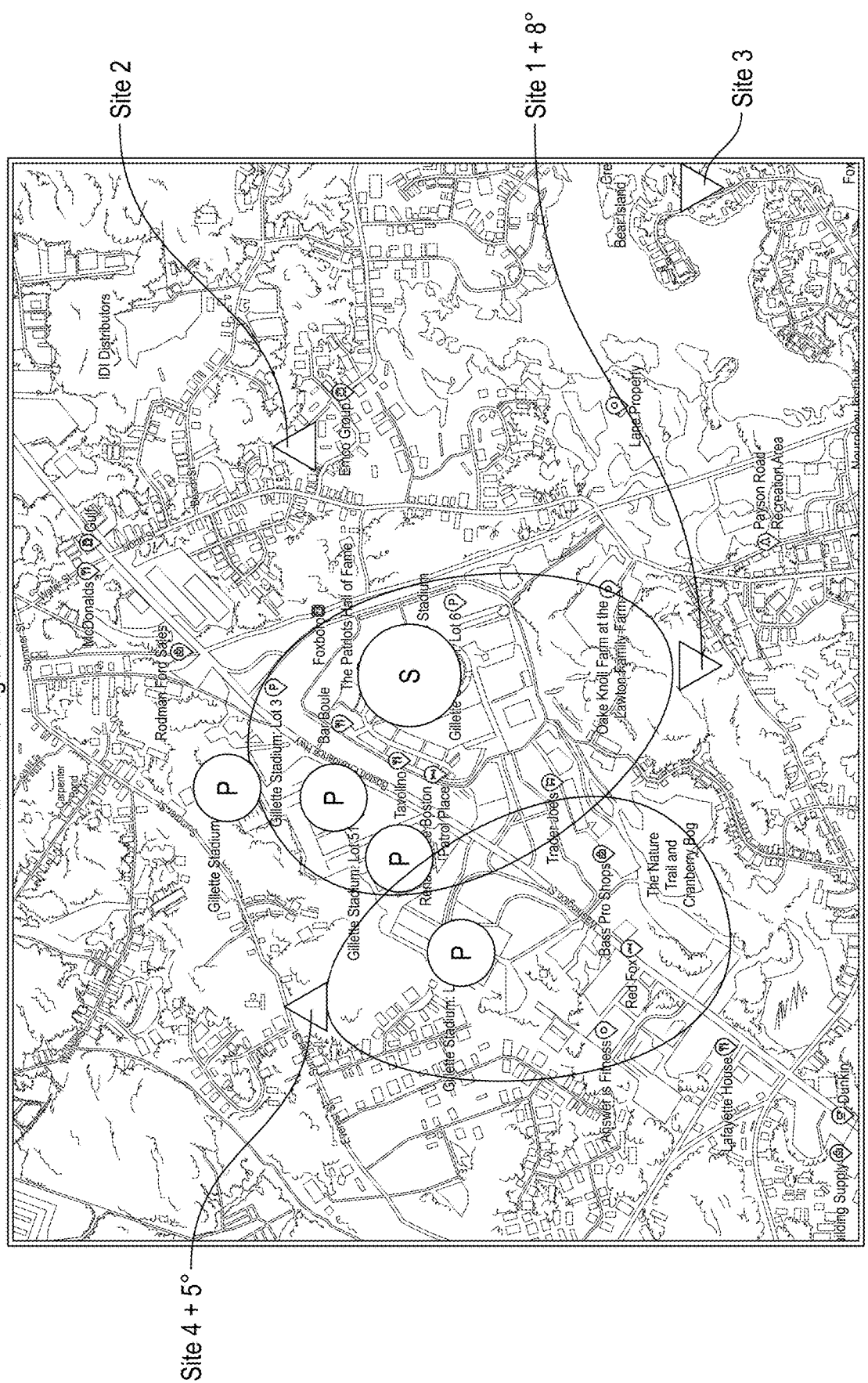

FIG. 25 illustrates another exemplary screen which allows an added level of configuration to provide a methodology of selecting and grouping various ALD's from the same and/or different antenna sites to define various coverage configurations. FIG. 25 illustrates the selection of 6 antennas on two different sites (Site 1 and Site 4) to provide two different coverage configurations for a stadium event area (S) as shown in FIGS. 26 and 27. For example, Site 1 Sector A Event Configuration is to +8° (Left) while Site 4 Sector C is set to +5° (Left), with 0 set as a center azimuth direction.

FIG. 26 illustrates an exemplary coverage configuration for a normal everyday coverage pattern for Sites 1 and 4. The antennas 1002 are primarily directed at the physical stadium infrastructure which may house offices, restaurants and other facilities which are in use on a daily basis. However, the reader will note that the larger parking areas (P) are not well covered in this configuration as they are normally empty. FIG. 27 illustrates a temporary "event" configuration pattern (A) which adjusts the azimuth angle of the various above-noted antennas in facing sectors (Site 1, Sector A) (Site 4, Sector C) to move the coverage pattern more closely toward parking lots (P) of the stadium (S) to better cover parking areas during an event.

Network operators often hire and locate mobile truck units with extendable towers and antennas to provide added surge capacity on game days. These mobile units are costly and must be set up and manned during use often requiring movement of the mobile unit so that the antenna is pointing in the correct direction. The above noted antenna mounts 1004 coupled with the software configurations and grouping methodology would allow network operators to simply define desired coverage patterns to improve network traffic generating additional revenue and reducing the costs of mobile surge capacity units. While the above-noted methodologies only describe configuration in terms of an azimuth rotation to adjust coverage pattern, the same grouping configurations can be applied to any and all AISG control units visible in the system, including mechanical downtilt and internal electrical downtilt. During optimization, the network may determine that changes to the azimuth position may create interference which can be reduced with added adjustments of mechanical downtilt and electrical downtilt. The network operator can, at will, adjust a single control unit, or all of the control units in line with a single antenna configuration on a site or multiple interconnected sites.

It can therefore be seen that the exemplary embodiments provide a remotely controllable antenna mount is particularly useful with a wireless telecommunication antenna to provide mechanical azimuth and/or tilt adjustment using AISG compatible motor control units and AISG control and monitoring systems to remotely adjust the physical orientation of the antenna.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A method of selectively adjusting telecommunication antenna devices comprising the steps of:
   providing at least two antenna sites, each antenna site having a corresponding control network interface (CNI) configured for AISG communication;
   providing at least one telecommunications antenna at each of said antenna sites;
   providing an antenna mount corresponding to a respective telecommunication antenna at each of said antenna sites, each antenna mount comprising:
   a structure interface mounted to an installation structure;
   an antenna interface mounted to said antenna, said antenna interface including an antenna mast having upper and lower pivots being rotatably connected to said structure interface through a pivot having a vertical axis and being rotatably movable about a vertical axis through a range of azimuth angle positions;
   a mount azimuth control unit (MACU) having a motor mechanically interconnected with said structure interface and said antenna interface, said MACU including an AISG compatible motor controller, said motor being controllable to drive rotatable movement of said antenna through said range of azimuth angle positions,
   a downtilt assembly interconnected between said antenna mast and an upper pivot on said antenna; and
   a mount tilt control unit (MTCU) mechanically interconnected with said downtilt assembly, said MTCU including an AISG compatible motor controller, said MTCU being controllable to drive movement of said antenna through said range of downtilt positions;
   serially interconnecting said MACU and said MTCU of each of said antennas with said CNI at each of said antenna sites;
   providing an ASIG compatible control system in communication with each CNI at each antenna site and in communication with each of said said MACU and said MTCU at each of said antenna sites; and
   selectively controlling at least one antenna mount through said control system to selectively mechanically adjust a physical orientation of said antenna relative to the other.

2. The method of claim 1 wherein step of selectively controlling said MACU and/or said MTCU at a respective antenna site comprises selectively mechanically adjusting a physical azimuth and/or downtilt orientation of at least one antenna relative to another.

3. A telecommunication antenna system comprising:
   at least two antenna sites, each antenna site having a corresponding control network interface (CNI) configured for AISG communication;
   at least one telecommunications antenna at each of said antenna sites;
   an antenna mount corresponding to a respective telecommunication antenna at each of said antenna sites, each antenna mount comprising:
   a structure interface mounted to an installation structure;
   an antenna interface mounted to said antenna, said antenna interface including an antenna mast having upper and lower pivots being rotatably connected to said structure interface through a pivot having a vertical axis and being rotatably movable about a vertical axis through a range of azimuth angle positions;
   a mount azimuth control unit (MACU) having a motor mechanically interconnected with said structure interface and said antenna interface, said MACU including an AISG compatible motor controller, said motor being controllable to drive rotatable movement of said antenna through said range of azimuth angle positions,
   a downtilt assembly interconnected between said antenna mast and an upper pivot on said antenna; and
   a mount tilt control unit (MTCU) mechanically interconnected with said downtilt assembly, said MTCU including an AISG compatible motor controller, said MTCU being controllable to drive movement of said antenna through said range of downtilt positions;
   said MACU and said MTCU of each of said antennas being serially with said CNI at each of said antenna sites; and
   an ASIG compatible control system in communication with each CNI at each antenna site and in communication with each of said said MACU and said MTCU at each of said antenna sites,
   wherein each CNI is operable for selectively controlling at least one antenna mount to selectively mechanically adjust a physical orientation of said antenna relative to the other.

4. The system of claim 3 wherein each CNI at each antenna site is operable for selectively mechanically adjusting a physical azimuth and/or downtilt orientation of at least one antenna relative to another.

* * * * *